United States Patent
Munkberg et al.

(10) Patent No.: US 11,475,542 B2
(45) Date of Patent: Oct. 18, 2022

(54) NEURAL NETWORK SYSTEM WITH TEMPORAL FEEDBACK FOR ADAPTIVE SAMPLING AND DENOISING OF RENDERED SEQUENCES

(71) Applicant: NVIDIA Corporation, Santa Clara, CA (US)

(72) Inventors: Carl Jacob Munkberg, Malmö (SE); Jon Niklas Theodor Hasselgren, Bunkeflostrand (SE); Anjul Patney, Kirkland, WA (US); Marco Salvi, Kirkland, WA (US); Aaron Eliot Lefohn, Kirkland, WA (US); Donald Lee Brittain, Pasadena, CA (US)

(73) Assignee: NVIDIA Corporation, Santa Clara, CA (US)

( * ) Notice: Subject to any disclaimer, the term of this patent is extended or adjusted under 35 U.S.C. 154(b) by 401 days.

(21) Appl. No.: 16/717,090

(22) Filed: Dec. 17, 2019

(65) Prior Publication Data
US 2020/0126191 A1 Apr. 23, 2020

Related U.S. Application Data

(63) Continuation-in-part of application No. 16/041,502, filed on Jul. 20, 2018.
(Continued)

(51) Int. Cl.
*G06T 5/00* (2006.01)
*G06T 7/246* (2017.01)
*G06T 7/50* (2017.01)

(52) U.S. Cl.
CPC ............. *G06T 5/002* (2013.01); *G06T 7/248* (2017.01); *G06T 7/50* (2017.01); *G06T 2207/10016* (2013.01); *G06T 2207/20084* (2013.01)

(58) Field of Classification Search
CPC ........... G06T 5/002; G06T 7/50; G06T 7/248; G06T 2207/10016; G06T 2207/20084
See application file for complete search history.

(56) References Cited

U.S. PATENT DOCUMENTS

| 6,028,608 A | 2/2000 | Jenkins |
| 6,801,655 B2 | 10/2004 | Woodall |

(Continued)

FOREIGN PATENT DOCUMENTS

CN 106331433 A 1/2017

OTHER PUBLICATIONS

Bengio et al., "Recurrent Neural Networks for Adaptive Temporal Processing," AT&T Bell Laboratories, (1993), pp. 1-35.
(Continued)

*Primary Examiner* — Yu Chen
(74) *Attorney, Agent, or Firm* — Leydig, Voit & Mayer, Ltd.

(57) ABSTRACT

A neural network-based rendering technique increases temporal stability and image fidelity of low sample count path tracing by optimizing a distribution of samples for rendering each image in a sequence. A sample predictor neural network learns spatio-temporal sampling strategies such as placing more samples in dis-occluded regions and tracking specular highlights. Temporal feedback enables a denoiser neural network to boost the effective input sample count and increases temporal stability. The initial uniform sampling step typically present in adaptive sampling algorithms is not needed. The sample predictor and denoiser operate at interactive rates to achieve significantly improved image quality and temporal stability compared with conventional adaptive sampling techniques.

19 Claims, 16 Drawing Sheets

Related U.S. Application Data

(60) Provisional application No. 62/884,453, filed on Aug. 8, 2019, provisional application No. 62/621,510, filed on Jan. 24, 2018, provisional application No. 62/537,800, filed on Jul. 27, 2017.

(56) References Cited

U.S. PATENT DOCUMENTS

| | | | |
|---|---|---|---|
| 7,346,208 | B2 | 3/2008 | Staelin et al. |
| 8,345,962 | B2 | 1/2013 | Yu et al. |
| 8,913,822 | B2 | 12/2014 | Matsuda et al. |
| 8,934,542 | B2 | 1/2015 | Wiegand et al. |
| 9,430,817 | B2 | 8/2016 | Schelten et al. |
| 9,915,625 | B2 | 3/2018 | Gao et al. |
| 10,701,394 | B1 * | 6/2020 | Caballero ............... G06N 3/08 |
| 2016/0321523 | A1 * | 11/2016 | Sen ................ G06N 3/084 |
| 2017/0262995 | A1 * | 9/2017 | Li ..................... G06V 40/20 |
| 2017/0262996 | A1 * | 9/2017 | Jain ................. G06K 9/628 |
| 2018/0129918 | A1 | 5/2018 | Wang et al. |
| 2018/0204314 | A1 | 7/2018 | Kaplanyan et al. |
| 2018/0253640 | A1 * | 9/2018 | Goudarzi ............. G06N 3/088 |
| 2018/0293712 | A1 * | 10/2018 | Vogels ................. G06K 9/627 |
| 2018/0293713 | A1 * | 10/2018 | Vogels ................. G06N 3/04 |
| 2019/0122076 | A1 * | 4/2019 | Sen ................... G06V 10/82 |
| 2019/0251360 | A1 * | 8/2019 | Cheri ................. G06V 20/40 |
| 2020/0012940 | A1 | 1/2020 | Liu et al. |
| 2020/0027198 | A1 * | 1/2020 | Vogels ................. G06V 10/30 |
| 2022/0005481 | A1 * | 1/2022 | Kim .................... G10L 17/02 |

OTHER PUBLICATIONS

Bako, et al., "Kernel-Predicting Convolutional Networks for Denoising Monte Carlo Renderings," ACM Trans. Graph. 36, 4 (2017).

Benty, et al., "The Falcor Rendering Framework," https://github.com/NVIDIAGameWorks/Falcor (2018).

Chakravarty, et al., "Interactive Reconstruction of Monte Carlo Image Sequences Using Recurrent Denoising Autoencoder," ACM Trans. Graph. 36, 4, Article 98 (2017), 98:1-98:12 pages.

Glorot, et al., "Understanding the difficulty of training deep feedforward neural networks," In Proceedings of the Thirteenth International Conference on Artificial Intelligence and Statistics (Proceedings of Machine Learning Research), Yee Whye The and Mike Titterington (Eds.), (2010) vol. 9, 249-256.

Goodfellow, et al., "Deep Learning," MIT Press, http://www.deeplearningbook.org (2016).

Kingma, et al., "Adam: A Method for Stochastic Optimization," In Proceedings of the $3^{rd}$ International Conference for Learning Representations (2015).

Kuznetsov, et al., "Deep Adaptive Sampling for Low Sample Count Rendering," Computer Graphics Forum 37 (2018) 35-44.

Paszke, et al., "Automatic differentiation in PyTorch," In NIPS-W (2017).

Ronneberger, et al., "U-Net: Convolutional Networks for Biomedical Image Segmentation," CoRR abs/1505.04597 (2015). http://arxiv.org/abs/1505.04597.

Sajjadi, et al., "Frame-Recurrent Video Super-Resolution," arXiv e-prints (2018). http://arxiv.org/abs/1801.04590.

Schied, et al., "Spatiotemporal Variance-guided Filtering: Real-time Reconstruction for Path-traced Global Illumination," In Proceedings of High Performance Graphics (HPG '17), Article 2, 2:1-2:12 pages.

Schied, et al., "Gradient Estimation for Real-time Adaptive Temporal Filtering," Proc. ACM Comput. Graph. Interact. Tech. 1, 2, Article 24 (2018), 24:1-24:16 pages.

Vogels, et al., "Denoising with Kernel Prediction and Asymmetric Loss Functions," ACM Trans. Graph. 37, 4, Article 124 (2018), 15 pp.

Wang, et al. "Video-to-Video Synthesis," arXiv e-prints (Aug. 2018), arXiv:1808.06601.

Zwicker, et al., "Recent Advances in Adaptive Sampling and Reconstruction for Monte Carlo Rendering," Computer Graphics Forum (Proceedings of Eurographics—State of the Art Report) 34, 2 (2015), 667-681.

Bauszat, P., et al., "Guided image filtering for interactive high-quality global illumination," Proceedings of the Twenty-second Eurographics Conference on Rendering, Jun. 2011, pp. 1361-1368.

* cited by examiner

NEURAL NETWORK SYSTEM WITH TEMPORAL FEEDBACK FOR ADAPTIVE SAMPLING AND DENOISING OF RENDERED SEQUENCES

CLAIM OF PRIORITY

This application is a continuation-in-part of U.S. application Ser. No. 16/041,502 titled "Temporally Stable Data Reconstruction with an External Recurrent Neural Network," filed Jul. 20, 2018 that claims the benefit of U.S. Provisional Application No. 62/537,800 titled "Temporally Stable Image Restoration With Warped Recurrent Neural Networks," filed Jul. 27, 2017 and U.S. Provisional Application No. 62/621,510 titled "Temporally Stable Image Reconstruction Using Warped Recurrent Convolutional Networks," filed Jan. 24, 2018, the entire contents of which are incorporated herein by reference. This application also claims the benefit of U.S. Provisional Application No. 62/884,453 titled "Neural Temporal Adaptive Sampling and De-Noising," filed Aug. 8, 2019, the entire contents of which are incorporated herein by reference.

FIELD OF THE INVENTION

The present invention relates to data reconstruction, and more particularly to using a neural network for adaptive sampling and denoising of rendered sequences.

BACKGROUND

Image reconstruction is used to remove artifacts from input images. Examples of artifacts include missing pixel data, aliasing, noise, and low resolution. Advances have been made in adaptive sampling for rendering images, reducing the number of samples needed to produce each image. However, the sample reduction often results in the loss of high-frequency details and, when applied to sequences of images (e.g., video), temporal artifacts may be introduced. In contrast, real-time rendering cannot afford the time to compute additional samples per pixel, and thus relies on approximate solutions based on spatio-temporal image reconstruction filters applied to one sample per-pixel images. Image reconstruction, specifically denoising, is used to remove artifacts from the rendered images. There is a need for addressing these issues and/or other issues associated with the prior art.

SUMMARY

A method, computer readable medium, and system are disclosed for adaptive sampling and denoising of rendered sequences. Guide data for a rendered image frame in a sequence of rendered image frames is received, the sequence including a previous rendered image frame and the rendered image frame. External state including a reconstructed previous rendered image frame with fewer artifacts compared with the previous rendered image frame is received, where the external state is warped, using difference data corresponding to changes between the previous rendered image frame and the rendered image frame, to produce warped external state. The guide data for the rendered image frame is processed using layers of a neural network model to produce a sample map that indicates a number of samples to be computed for each pixel in the rendered image frame, where the warped external state is input to one or more of the layers of the neural network.

A neural network-based rendering technique increases temporal stability and image fidelity of low sample count ray tracing by optimizing a distribution of samples for rendering each image in a sequence. A sample predictor neural network learns spatio-temporal sampling strategies, such as placing more samples in dis-occluded regions and tracking specular highlights. Temporal feedback enables a denoiser neural network to boost the effective input sample count and increases temporal stability. The initial uniform sampling step typically present in adaptive sampling algorithms is not needed. The sample predictor and denoiser are trained and run at interactive rates to achieve significantly improved image quality and temporal stability compared with conventional adaptive sampling techniques.

DETAILED DESCRIPTION

A neural network structure, namely a warped external recurrent neural network, may be used for reconstructing data. The warped external recurrent neural network can be applied to reconstruct image data and non-image data, such as audio data, data acquired by depth sensors (e.g., lidar, radar, and the like), data acquired by temperature sensors, density data (e.g., medical imaging and geological), and the like. The warped external recurrent neural network is not recurrent at each layer and has a feed-forward flow—only warping external state output by the final layer. In contrast, in a conventional recurrent neural network, hidden state generated at each layer is provided as a feedback input to the generating layer. The warped external recurrent neural network is trained end-to-end to minimize the errors, between pairs of aliased and antialiased images. During supervised training, the warped external recurrent neural network learns to identify aliased image features and to adaptively remove (i.e., filter out) the undesirable artifacts (e.g., aliased image features) and/or modify areas with missing and incorrect information. After being trained, the warped external recurrent neural network may be deployed to reconstruct data.

Figure 1A:
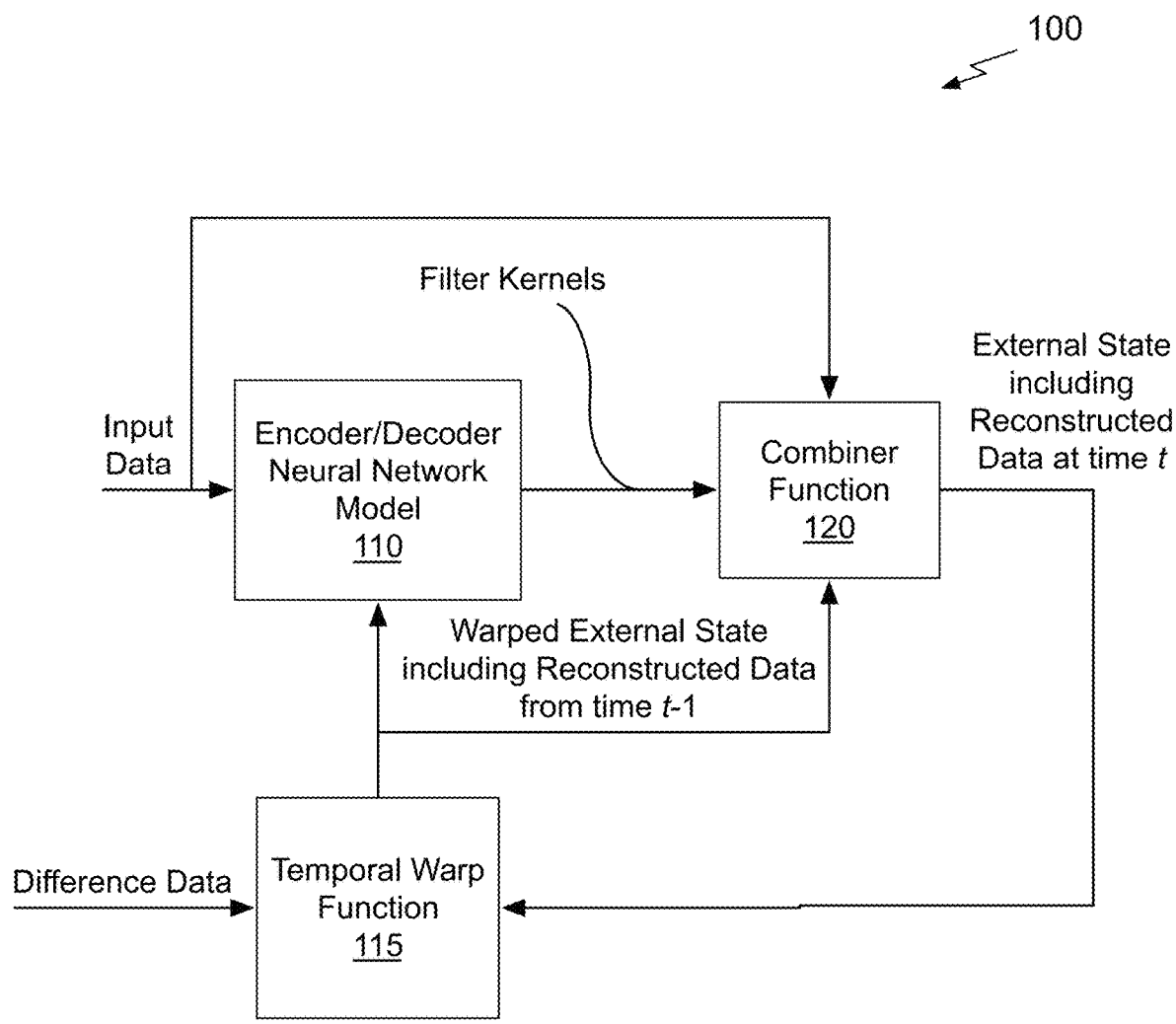
FIG. 1A illustrates a block diagram of a warped external recurrent neural network, in accordance with an embodiment.

FIG. 1A illustrates a block diagram of a warped external recurrent neural network 100, in accordance with an embodiment. The warped external recurrent neural network includes an encoder/decoder neural network model 110, a temporal warp function 115, and a combiner function 120. Although the warped external recurrent neural network 100 is described in the context of processing units, one or more of the encoder/decoder neural network model 110, the temporal warp function 115, and the combiner function 120 may be performed by a program, custom circuitry, or by a combination of custom circuitry and a program. For example, the encoder/decoder neural network model 110 may be implemented by a GPU (graphics processing unit), CPU (central processing unit), or any processor capable of implementing layers of a neural network. Furthermore, persons of ordinary skill in the art will understand that any system that performs the operations of the warped external recurrent neural network 100 is within the scope and spirit of embodiments of the present invention.

The encoder/decoder neural network model 110 receives input data at time t and warped external state from the previous iteration i.e., at time t−1. The input data includes artifacts that are removed during the reconstruction process to produce output data that approximates the input data without the artifacts. In the context of the following description, output data that approximates the input data without the artifacts has fewer artifacts compared with the input data. The warped external state from time t−1 includes warped reconstructed data from time t−1.

The encoder/decoder neural network model 110 processes the input data and the warped external state using multiple layers to produce at least one filter kernel. In an embodiment, the at least one filter kernel is a collection of filter kernels corresponding to different spatial areas. The combiner function 120 receives the at least one filter kernel, the input data from time t, and warped reconstructed data from time t−1. The combiner function 120 applies at least a first portion of the at least one filter kernel to the reconstructed data to produce filtered first input data. The combiner function 120 applies at least a second portion of the at least one filter kernel to the input data to produce filtered second input data.

In an embodiment, the filtered first input data corresponds to a portion of the input data from time t−1 without artifacts and the filtered second input data corresponds to a portion of the input data from time t. The combiner function 120 then sums the filtered first input data and the filtered second input data to produce at least a portion of the external state at time t. The external state at time t includes a portion of the reconstructed input data at time t−1. In an embodiment, the at least one filter kernel is applied to different portions of the reconstructed data and the input data to produce remaining portions of the external state.

The temporal warp function 115 also receives per-datum differences (difference data) corresponding to the input data at time t and the external state from time t−1. Note, that when the input data is image data, the per-datum differences may be motion flow or motion vectors. The temporal warp function 115 warps the external state based on the per-datum differences to produce the warped external state for time t−1. The warping aligns the external state from time t−1 to the input data at time t. In the context of the following description, the external state includes hidden state from only the last layer of the encoder/decoder neural network model 110 and reconstructed data that approximates the input data without artifacts. The hidden state generated by the last layer may implicitly include information from previous input data frames that is incorporated into the hidden state for each timestep. In an embodiment, the external state comprises features of the input data that are extracted by the encoder/decoder neural network model 110. In an embodiment, the encoder/decoder neural network model 110 receives the warped external state including reconstructed data from time t−1 and the combiner function 120 receives the reconstructed data from time t−1.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

When the warped external recurrent neural network 100 is used to generate antialiased images, the input images include aliasing artifacts and the external state includes a reconstructed image that is antialiased. As shown in FIG. 1A, the external state is warped by the temporal warp function 115 according to difference data to produce warped external state including a processed warped reconstructed image for a first image (time t−1) in a sequence. The warping aligns the external state to a next aliased input image (time t) in the sequence. The next aliased input image and the warped external state are processed by the encoder/decoder neural network model 110 to produce second external state including a reconstructed second image that approximates the next aliased input image (time t) in the sequence without artifacts (i.e., the antialiased next image).

In an embodiment, the external state includes the reconstructed input for only one image (the last processed image). By applying the warped external recurrent neural network 100 over an image sequence, one image at a time, the neural network model outputs a sequence of temporally-stable reconstructed images, one image at a time. In an embodiment, the external state carries information about one or more previous images. The encoder/decoder neural network model 110 is trained to predict spatially variant filter kernels using supervised learning techniques to learn parameters (e.g., weights and bias values) that maximize image quality and temporal stability. In an embodiment, the encoder/decoder neural network model 110 computes a dynamic per-pixel kernel filter and the combiner function 120 applies the filter kernel to the input image and the reconstructed previous image.

The warped external recurrent neural network 100 achieves high-quality, temporally-stable antialiasing by integrating information from current and prior frames. To maximize temporal reuse, the temporal warp function 115 warps prior reconstructed image data using the per-pixel motion vectors. To achieve reuse without incurring the storage and performance overheads of conventional recurrent neural networks, the warped external recurrent neural network 100 uses no additional storage during inferencing and incurs no slowdown compared to a feed-forward neural network.

In an embodiment, a sequence of one sample-per-pixel temporally-unstable images is converted into a temporally-stable image sequence equivalent in quality to 16 (or some other value greater than 1) samples-per-pixel images. When performing antialiasing, the output image sequence does not suffer from the over-blurring, ghosting, flickering artifacts of current solutions and the warped external recurrent neural network 100 produce a temporally-stable image sequence in real time. Reconstruction performance of the warped external recurrent neural network 100 is dependent on image size and is independent of scene complexity.

Figure 1B:
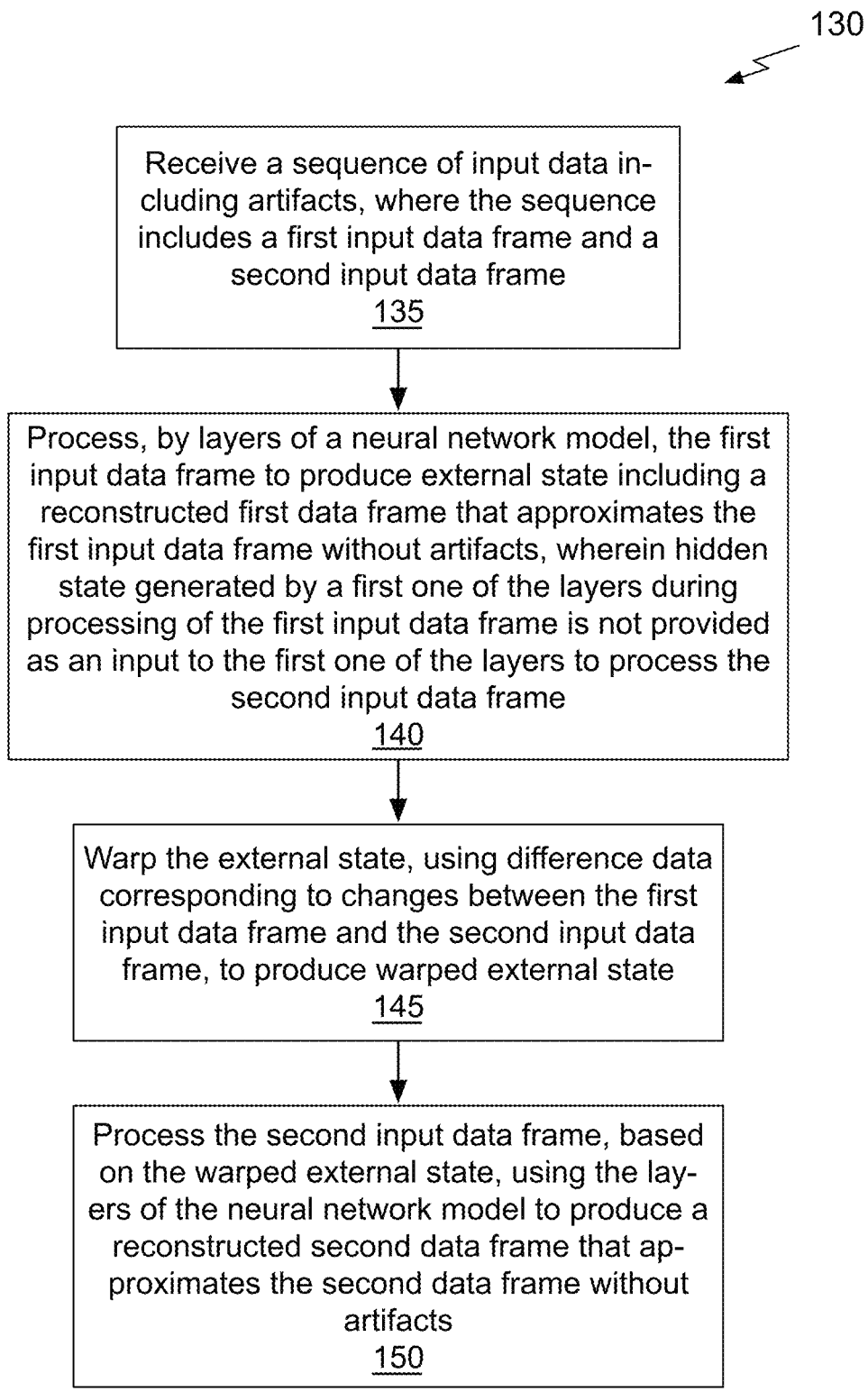
FIG. 1B illustrates a flowchart of a method for temporally stable data restoration, in accordance with an embodiment.

FIG. 1B illustrates a flowchart of a method 130 for temporally stable data restoration, in accordance with an embodiment. Although method 130 is described in the context of a processing unit, the method 130 may also be performed by a program, custom circuitry, or by a combination of custom circuitry and a program. For example, the method 130 may be executed by a GPU (graphics processing unit), CPU (central processing unit), or any processor capable of implementing the warped external recurrent neural network 100. Furthermore, persons of ordinary skill in the art will understand that any system that performs method 130 is within the scope and spirit of embodiments of the present invention.

At step 135, a sequence of input data including artifacts is received by the warped external recurrent neural network 100. The sequence includes a first input data frame and a second input data frame. In the context of the following description, an input data frame may include image data or other types of data. In an embodiment, the input data comprises rendered image frames.

At step 140, the first input data frame is processed using layers of a neural network model to produce external state including a reconstructed first data frame that approximates the first input data frame without artifacts. In an embodiment, the first input data frame is processed by layers of the encoder/decoder neural network model 110. Hidden state generated by a particular one of the layers during processing of the first input data frame is not provided as an input to the particular one of the layers to process the second input data frame. In other words, each of the layers does not incorporate a feedback connection to use hidden state generated for a previous frame to generate outputs and/or hidden state for the current frame.

At step 145, the external state is warped by the temporal warp function 115, using difference data corresponding to changes between the first input data frame and the second input data frame (e.g., optical flow, motion vectors, or the like), to produce warped external state. Warping the external state anchors individual characteristics or features to regions within the data frames. The warped external state enables improved tracking over time by integrating information associated with changing features over multiple frames in a sequence, producing more temporally stable and higher quality reconstructed data. At step 150, the second input data frame is processed, based on the warped external state, using the layers of the neural network model to produce a reconstructed second data frame that approximates the second input data frame without artifacts.

The encoder/decoder neural network model 110 is trained using training datasets including sequences of data frames and inter-frame per-datum differences to predict kernels that produce temporally stable sequences of reconstructed data frames. Importantly, when deployed, the warped external recurrent neural network 100 may perform reconstruction in real-time, for example, keeping pace with image rendering or image capture.

In an embodiment, the parameters (e.g., weights and biases) of the encoder/decoder neural network model 110, determined during training, are immutable at inference time and cannot adapt to particular data regions within each frame. In another embodiment, the parameters of the encoder/decoder neural network model 110 determined during training may be modified or calculated during inferencing. Kernel-predicting networks (KPNs), enable a neural network model to generate adaptive spatially-varying kernels by training the neural network model coupled to a filtering module, such as the combiner function 120. As shown in FIG. 1A, a kernel-predicting autoencoder may be constructed by feeding the spatially-varying kernels output by the encoder/decoder neural network model 110 to the combiner function 120. In contrast with conventional KPNs, image sequences generated by the warped external recurrent neural network 100 are temporally stable and the spatially-varying kernels output by the encoder/decoder neural network model 110 are temporally stable.

In an embodiment, the warped external state and the processed second input data frame are processed by the encoder/decoder neural network model 110 to generate spatially-varying filter kernels. When the sequence of input data is an image sequence, the combiner function 120 applies a first filter kernel to pixels of the reconstructed first data frame (from time t−1) and applies a second filter kernel to pixels of the processed second input data frame (from time t). In an embodiment, the second filter kernel is a hierarchy of filter kernels. The filtered pixels are combined (i.e., summed) to produce external state including pixels of the reconstructed second data frame.

In an embodiment, the combiner function 120 computes the color of a reconstructed pixel p by performing the dot product of the spatially-varying kernel-predicted weights $A^p$ against a 5×5 pixel patch of the input x around p:

$$\hat{y}^p = \langle A^p, \mathcal{N}_{5\times 5}^p(x) \rangle. \tag{1}$$

While a larger adaptive filter might improve image quality, a 5×5 kernel may be used to provide a good balance between computational cost and reconstruction quality, especially because aliasing artifacts tend to occur at small scale. In an embodiment, one spatially-varying kernel-predicted weight is removed from the 5×5 frame kernel filter $A^p$ to ensure that the encoder/decoder neural network model 110 output has 32 channels. Processing slowdown may be avoided on particular hardware platforms by rounding down the output channels of the final convolution layer from 34 to 32.

Figure 1C:
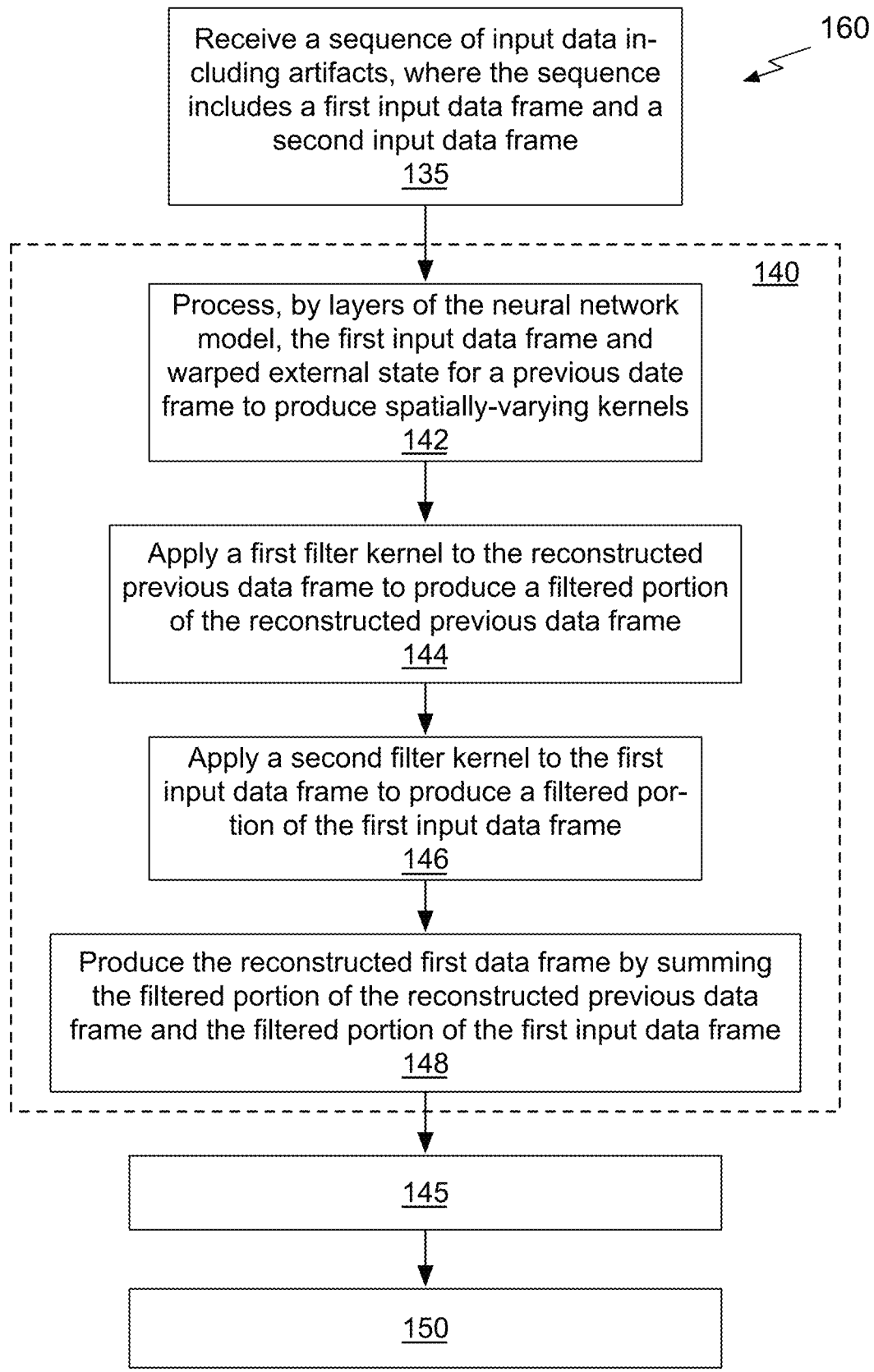
FIG. 1C illustrates another flowchart of the method for temporally stable data restoration, in accordance with an embodiment.

FIG. 1C illustrates a flowchart of the method 160 for temporally stable data restoration, in accordance with an embodiment. Although method 160 is described in the context of a processing unit, the method 160 may also be performed by a program, custom circuitry, or by a combination of custom circuitry and a program. For example, the method 160 may be executed by a GPU (graphics processing unit), CPU (central processing unit), or any processor capable of implementing the warped external recurrent neural network 100. Furthermore, persons of ordinary skill in the art will understand that any system that performs method 160 is within the scope and spirit of embodiments of the present invention.

The method 160 includes steps 135, 145, and 150 from the method 130. At step 135, a sequence of input data including artifacts is received by the warped external recurrent neural network 100. The sequence includes a first input data frame and a second input data frame. In the context of the following description, an input data frame may include image data or other types of data.

Step 140 of the method 130 may include steps 142, 144, 146, and 148. At step 142, the first input data frame and warped external state for a previous data frame is processed using layers of the encoder/decoder neural network model 110 to produce spatially varying kernels. The warped external state includes a reconstructed previous data frame that approximates the previous input data frame without artifacts. Hidden state generated by each one of the layers during processing of the reconstructed previous data frame and the first input data frame is not provided as an input to the layer that generated the hidden state to process the second input data frame. In an embodiment, the spatially varying kernels include a first filter kernel and a second filter kernel.

At step 144, the combiner function 120 applies the first filter kernel to the warped reconstructed previous data frame to produce a filtered portion of the reconstructed previous data frame. At step 146, the combiner function 120 applies the second filter kernel to the first input data frame to produce a filtered portion of the first input data frame. Steps 144 and 146 may be repeated to produce additional filtered portions of the reconstructed previous data frame and additional filtered portions of the first input data frame.

At step 148, the combiner function 120 produces the reconstructed first data frame by summing the filtered portion of the reconstructed previous data frame and the filtered portion of the first input data frame. Step 148 may be repeated to sum the additional filtered portions of the warped reconstructed previous data frame and the additional filtered portions of the first input data frame. Steps 145 and 150 are completed as previously described.

To best understand the encoder/decoder neural network model 110 a review of an implementation using a convolutional neural network (CNN) is instructional. A CNN stacks convolutional layers, that are trained via stochastic gradient descent (SGD). Each convolutional layer $C_{n \times n}^l$ applies a convolution $W^l$ over a n×n region of the previous layer activation $a^{l-1}$ and offsets the result via a bias vector $b^l$, followed by non-linear function σ:

$$a^l = C_{n \times n}^l(a^{l-1}) = \sigma(W^l * a^{l-1} + b^l).$$

Complex CNNs stack dozens of layers and generate very deep data representations of hundreds of feature channels per datum. Achieving state-of-the-art results requires substantial computational resources, partially explaining the lack of deep neural networks (DNN) in real-time rendering. The recent introduction of GPU tensor cores that accelerate mixed precision matrix multiplication enables the use of DNNs for real-time processing.

Convolutional autoencoders are a class of deep neural networks that learn end-to-end mappings between images. A first encoder block extracts a progressively compressed representation of the input x through a sequence of convolutional layers followed by a pooling operator $\mathcal{P}_{m \times m}$ which downsamples by computing the largest activation in a m×m region. The pooling operator may implement max pooling, average pooling, or other types of pooling. Starting with $e_0 = x$, successive encoder stages can be computed as:

$$e_{i+1} = \mathcal{P}_{m \times m}(C_{n \times n}( \ldots C_{n \times n}(e_i))).$$

The last encoder stage generates a latent variables representation of the input, which is uncompressed by a succession of decoder stages:

$$d_{i+1} = \mathcal{U}_{k \times k}(C_{n \times n}( \ldots C_{n \times n}(d_i))),$$

where $\mathcal{U}_{k \times k}$ is a k×k upsampling operator. Finally, the output image is computed as:

$$\hat{y} = (C_{n \times n}( \ldots C_{n \times n}(d_0))).$$

Therefore, antialiasing may be modeled as an image reconstruction problem and a convolutional autoencoder may be used as a starting point to develop the encoder/decoder neural network model 110.

Figure 2A:
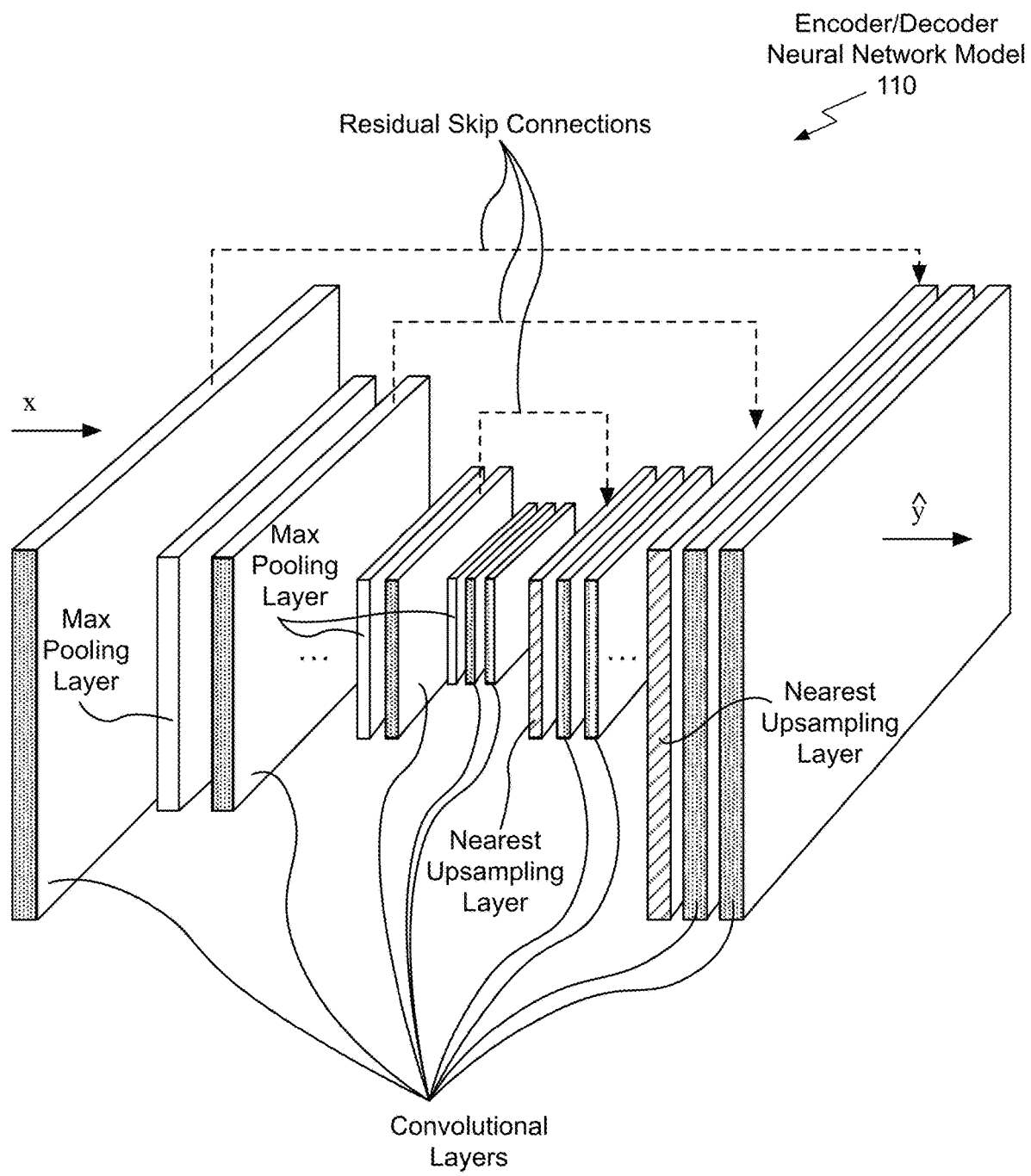
FIG. 2A illustrates a block diagram of the encoder/decoder neural network model from FIG. 1A, in accordance with an embodiment.

FIG. 2A illustrates a block diagram of the encoder/decoder neural network model 110 from FIG. 1A, in accordance with an embodiment. In an embodiment, each stage of the encoder portion of the encoder/decoder neural network model 110 uses one convolutional layer and a pooling layer. In an embodiment, 3×3 convolutions are used in the encoder/decoder neural network model 110. In an embodiment, the convolutional layers of the encoder portion are N×N, each followed by a 2×2 max pooling layer, where N=32, 64, 96, 128, 160, and 160 in a feed-forward sequence with the output of each max pooling layer input to each convolutional layer. In an embodiment, strided convolutions are used instead of pooling. In an embodiment, each stage of the decoder portion of the encoder/decoder neural network model 110 uses a nearest upsampling layer followed by two convolutional layers. In an embodiment, a pair of convolutional layers of the decoder portion are N×N, each proceeded by a 2×2 nearest upsampling layer, where N=160, 128, 96, 64, and 32 in a feed-forward sequence with the output of each upsampling layer input to each convolutional layer pair. In an embodiment, the output of each encoder stage is propagated to the corresponding decoder stage via residual skip connections and accumulated with the output of an upsampling layer. The residual skip connections improve reconstruction quality and may enable faster training of deep convolutional networks by improving the back propagation of gradients.

Figure 3:
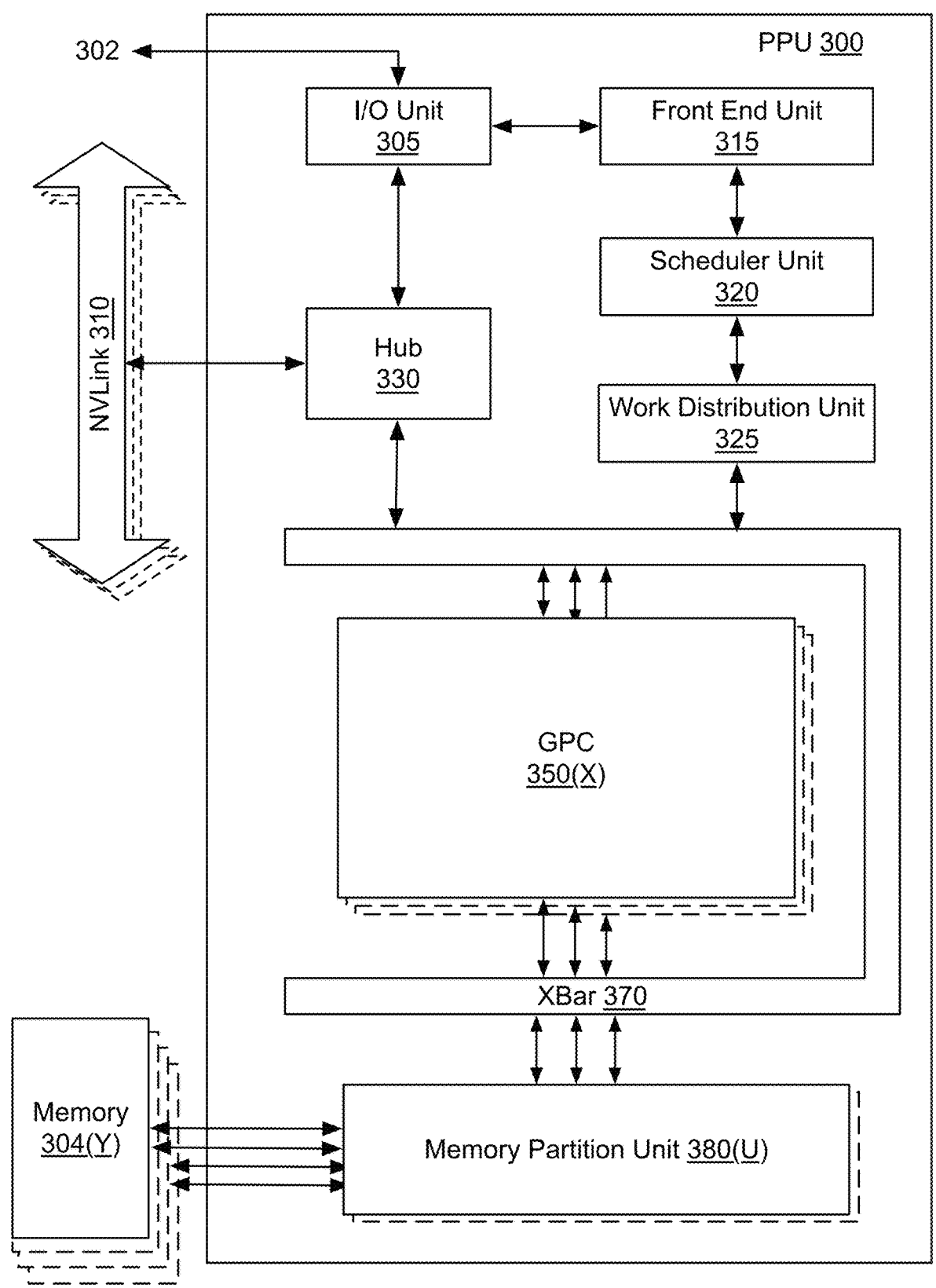
FIG. 3 illustrates a parallel processing unit, in accordance with an embodiment.

In an embodiment, the encoder/decoder neural network model 110 utilizes specialized tensor cores within a GPU, such as the tensor cores within the PPU 300 shown in FIG. 3. To take advantage of the tensor cores, 16-bit tensors and weights are used. In an embodiment, the slowest layers of an encoder/decoder neural network model 110 are the outermost, high resolution layers. The cost of a 3×3 convolution layer at 1080 pixel resolution varies with input and output channel counts. In particular, little variation occurs as output channel count changes from 8 to 64, but a significant slowdown occurs at 40 input channels. Thus, to maximize performance, in an embodiment, the number of input channels for convolution layers is limited to 32. In an embodiment, when the CUDA API is used to implement matrix operations on the tensor cores, each nearest upsampling layer is fused with the following residual skip connection, such that both operations happen within the same CUDA kernel.

Defining specific layer and channel counts is not as relevant for achieving high image quality and temporal stability performance of an encoder/decoder neural network model, as real-time performance constraints mostly dictate how many layers can be used at higher resolution. The external recursion and warping features of the encoder/decoder neural network model 110 are more important in order to achieve high image quality and temporal stability.

A convolutional autoencoder is a stateless feedforward neural network that does not remember information from past frames. Furthermore, a conventional autoencoder cannot learn a temporally coherent representation of the input data when trained only on single image pairs (each image pair includes an image with artifacts and a "ground truth" image without the artifacts). Feeding the neural network sequences of several frames adds computational and memory overheads that can easily prevent optimizing inference performance for real-time rendering applications.

Figure 2B:
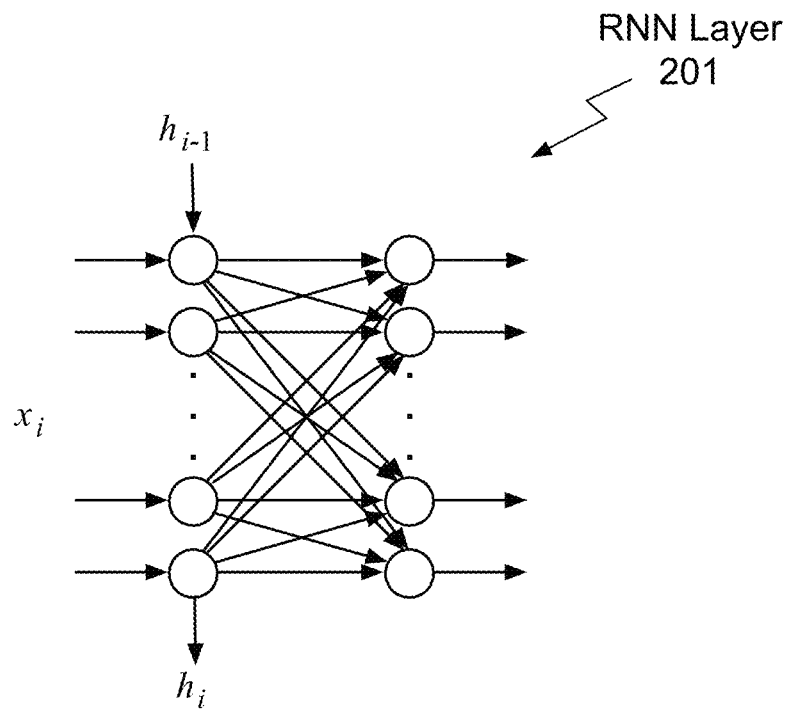
FIG. 2B illustrates a diagram of a prior art recurrent neural network layer.

FIG. 2B illustrates a diagram of a prior art recurrent neural network layer 201. Neurons or nodes (represented by circles) in a first recurrent convolutional layer generate outputs to neurons or nodes of a second convolutional layer. The recurrent convolutional layer is a stateful machine that can learn how to use past information generated by the recurrent convolutional layer and stored in hidden state $h_{i-1}$ to process a new input $x_i$ while generating hidden state $h_i$. RNN layers process arbitrarily long sequences of inputs, such as image sequences, and are natural candidates for temporally stable image reconstruction. The hidden state generated by the first recurrent convolutional layer during processing of a first frame is stored and provided as an input to the first recurrent convolutional layer to process a second frame.

Figure 2C:
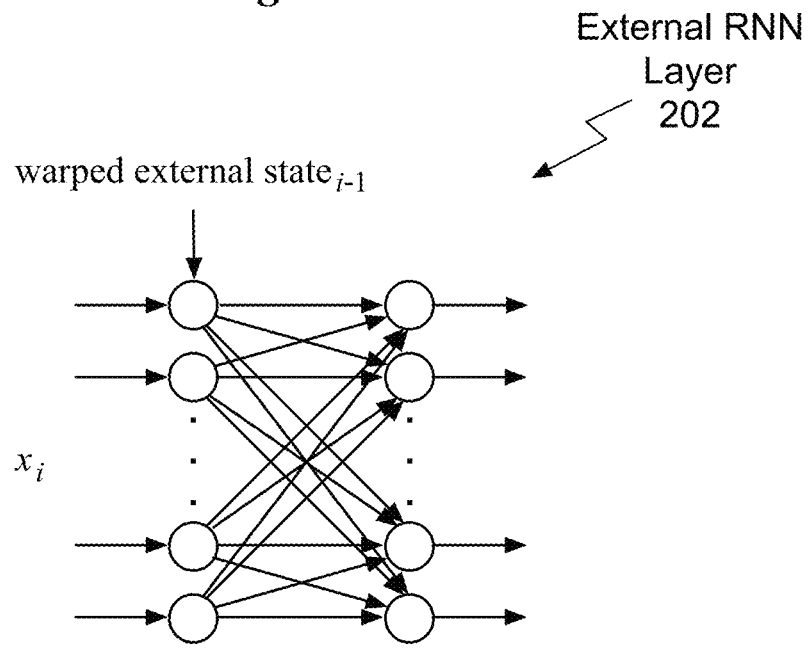
FIG. 2C illustrates a diagram of neural network layers without hidden state recursion, in accordance with an embodiment.

FIG. 2C illustrates a diagram of layers of an external neural network layer 202 without hidden state recursion, in accordance with an embodiment. Instead of receiving hidden state generated by the first convolutional layer during processing of a previous frame, the first convolutional layer receives the warped external state generated by the encoder/decoder neural network model 110 during processing of a previous frame. The encoder/decoder neural network model 110 functions as a single recurrent layer.

The warped external state generated by the encoder/decoder neural network model 110, combiner function 120, and temporal warp function 115 acts as the hidden state for the encoder/decoder neural network model 110 and is used as input along with the next data frame. The external recursion configuration has four key advantages. First, the encoder/decoder neural network model 110 may be trained with data frame sequences, allowing the encoder/decoder neural network model 110 to output high quality as well as temporally coherent results. Second, the external state is reduced to just a few megabytes per data frame. Third, the additional cost to process the external state is virtually zero on modern GPUs. Lastly, at inference time the encoder/decoder neural network model 110 acts like a non-recurrent neural network, allowing use of simpler layer models since no internal state is stored or updated.

However, using external recurrence alone is insufficient to guarantee temporally coherent results. The max pooling layers within the encoder/decoder neural network model 110 effectively force learning of translational invariance of data features within the frames. While useful for classification, translational invariance reduces a neural network's ability to precisely identify correspondences between features from current and prior data frames, degrading temporal reuse along edges (where temporal reuse is most important).

Therefore, motion data, such as per-pixel motion vectors generated by modern real-time applications or other sources, such as through optical flow analysis, are used to warp the external state. In an embodiment, the external state is warped with a reprojection filter θ to align the external state at t−1 to the current data frame at t. In an embodiment, the reprojection filter is bi-linear, bi-cubic, or any other type of filter. When the warped external recurrent neural network 100 is used to perform antialiasing, the warping aligns pixels from prior image frames to the same surfaces in the current image frame, removing range limitations imposed by a receptive field of the encoder/decoder neural network model 110 and enabling small kernels to find correspondences with prior image frames. At the beginning of each training iteration, difference data for the input data frame are used by the temporal warp function 115 to fetch pixels from the previous reconstructed data frame, using bilinear filtering to smooth the fetched results. Relying on the difference data enables efficient searching to identify correspondences between features. The warped (i.e., reprojected) external state coincides with the final antialiased image. However, the warping is not restricted to antialiasing and applies to any hidden state containing higher level representations of images or other data.

Because the external state and the current data frame are aligned, the encoder/decoder neural network model 110 is explicitly trained to generate spatio-temporal filters that integrate the previously reconstructed data frame with the current data frame, while "hallucinating" new samples. Equation (1) is modified to include a second 3×3 pixel kernel B generated by the encoder/decoder neural network model 110 that acts on the warped hidden state θ (h):

$$\tilde{y}^p = \langle A^p, \mathcal{N}_{5\times5}{}^p(x) \rangle + \langle B^p, \mathcal{N}_{3\times3}{}^p(\theta(h)) \rangle. \qquad (2)$$

A smaller pixel footprint is used in kernel B because image features stored in hidden state are less likely to contain aliasing artifacts and the smaller kernel enables faster performance. In an embodiment, one spatially-varying kernel-predicted weight is removed from each from the (5×5) pixel kernel $A^p$ and the (3×3) pixel kernel B to ensure that the encoder/decoder neural network model 110 output has 32 channels.

The warped external recurrent neural network 100 driven by Equation (1) and Equation (2) yields significantly lower spatial and temporal error, improving reconstructed data quality and temporal stability. The approach in Equation (2) does not dictate any particular integration method, letting the encoder/decoder neural network model 110 learn how to best accumulate and reject individual samples.

Adaptive Sampling and Denoising of Rendered Sequences

In an embodiment, the encoder/decoder neural network model 110 is configured to perform hierarchical kernel prediction for denoising sequences of image frames rendered using adaptive sampling. While one level of kernel prediction is used for creating anti-aliased images from aliased input, one level may not be adequate for denoising sparsely sampled ray traced images. Typically, much larger filters, covering large regions on screen, are needed to denoise sparsely sampled ray traced images. Therefore, in an embodiment, one level of kernel prediction is replaced with three levels of kernel prediction for denoising sparsely sampled ray traced images. In other embodiment, fewer or more levels of kernel prediction may be used.

Specifically, the outputs of the last three hierarchical levels of the encoder/decoder neural network model 110 are each fed through a small network to predict filter weights of a multi-scale kernel. In an embodiment, the small network is implemented using a fully-connected network (e.g., 1×1 convolutions) or a few layers with rectified linear units (ReLUs) between each layer to map the outputs to filter weights. In an embodiment, the filter weights are a set of unique 5×5 weights (e.g., filter kernel) for each pixel in a scaled image frame. In an embodiment, the scaled image frames are the outputs of the last three hierarchical levels of the encoder/decoder neural network model 110 input image. The last three hierarchical levels, working back from the output, correspond to a full resolution noisy image, a 2× downscaled version of the full resolution noisy image, and a 4× downscaled version of the full resolution noisy image, respectively. The unique filter kernels are applied at each respective pixel in the scaled image frames to produce filtered current frames. The filtered current frames are combined by the combiner function 120 to produce a multi-scale filtered current frame. In an embodiment, the filtered current frames are combined by upscaling the filtered current frames to full resolution and summing the resulting three full resolution multi-scale filtered current frames. In an embodiment, the upscaled filtered current frames $F_i$ are combined using a weighted sum operation $sum(F_i*w_i)$, where the weight $w_i$ for each pixel is determined during training instead of simply computing $sum(F_i)$ for the upscaled filtered current frames.

Additionally, a predicted temporal 5×5 pixel kernel, is applied to the warped external state including the denoised previous frame to produce filtered warped external state that is then combined with the multi-scale filtered current frame to produce a reconstructed image frame that approximates the image frame without artifacts.

Figure 2D:
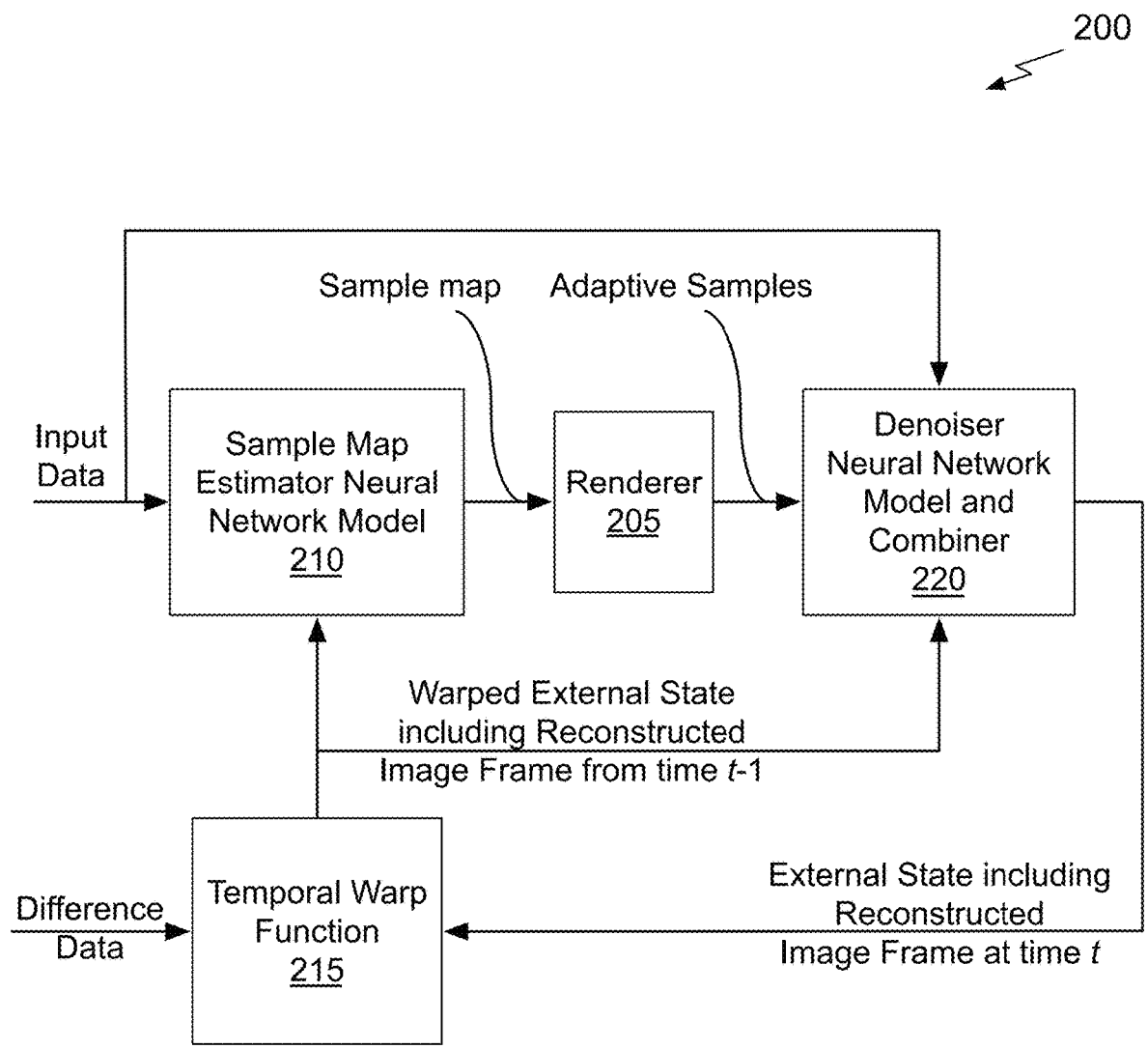
FIG. 2D illustrates a block diagram of a temporal adaptive sampling and de-noising system, in accordance with an embodiment.

FIG. 2D illustrates a block diagram of a temporal adaptive sampling and de-noising system 200, in accordance with an embodiment. The warped external recurrent neural network 200 includes a sample map estimator neural network model 210, a renderer 205, a denoiser neural network model and combiner 220, and a temporal warp function 215. Although the temporal adaptive sampling and denoising system 200 is described in the context of processing units, one or more of the sample map estimator neural network model 210, denoiser neural network model and combiner 220, and the temporal warp function 215 may be performed by a program, custom circuitry, or by a combination of custom circuitry and a program. For example, the sample map estimator neural network model 210 may be implemented by a GPU (graphics processing unit), CPU (central processing unit), or any processor capable of implementing layers of a neural network. Furthermore, persons of ordinary skill in the art will understand that any system that performs the operations of the temporal adaptive sampling and denoising system 200 is within the scope and spirit of embodiments of the present invention.

The temporal adaptive sampling and denoising system 200 is a warped external recurrent neural network structure that reconstructs sparsely sampled ray traced images. Rendered images, including images rendered using ray tracing, may include artifacts resulting from inadequate sampling. The artifacts may include a loss of high-frequency details and residual noise. For example, to produce nice looking soft shadows, many rays directed towards the light sources in the scene are needed, but many rays cannot necessarily be traced in real time. Therefore, an insufficient number of rays may be traced, resulting in a rendered image that may be very noisy.

The denoiser neural network model and combiner 220 is applied to adaptively sampled rendered images that may include artifacts. The denoiser neural network model and combiner 220 receives rendered image frames (e.g., adaptive samples) output by the renderer 205 or receives rendered image frames from other sources to produce reconstructed images. The rendered image frame (time=t) and the warped external state for the reconstructed image frame from the previous timestep (time=t−1) are processed by the denoiser neural network model and combiner 220 to produce external state including the reconstructed image frame (time=t). In an embodiment, the external state comprises features of the rendered image frame that are extracted by the denoiser neural network model and combiner 220. The reconstructed image frame has a higher effective sample count compared with the rendered image frame, meaning the reconstructed image frame appears to have fewer artifacts compared with the rendered image frame. The external state is transmitted by the recursive feedback loop and warped by the temporal warp function 215 according to per-pixel difference data (e.g., motion vectors) to produce warped external state including a processed warped reconstructed image frame (time=t−1). The warping aligns the external state to the next image frame in the sequence to be rendered.

In an embodiment, the external state is the denoised (e.g., reconstructed) rendered image frame (e.g., three channels, RGB). In another embodiment, the external state comprises more than 3 channels, such as 32 or 64 channels that are re-projected (e.g., warped according to the difference data).

Parameters of the sample map estimator neural network model 210 and the denoiser neural network model and combiner 220 that contribute to the external state are learned during training of the temporal adaptive sampling and denoising system 200. The reconstructed rendered image frame may be generated for any learned representation of the external state. In this embodiment, the external state consists of just three channels: the denoised color (R, G, B). In another embodiment, the external state could be a greater number of channels, such as 32 or 64 channels. The external state includes at least reconstructed data which is the reconstructed (e.g., denoised) adaptively sampled ray traced image frame corresponding to the input data.

The external state output by the denoiser neural network model and combiner 220 for each rendered image frame is re-projected by the temporal warp function 215 to produce the warped external state. In an embodiment, the temporal warp function 215 may be configured to perform the same operations as the temporal warp function 115. The re-projection is accomplished using per-pixel difference data (e.g., motion vectors) that indicate changes between the rendered image and a subsequent rendered image in a sequence (e.g., video frames).

As shown in FIG. 2D, the rendered image is an adaptively sampled noisy image, rendered as dictated by a sample map. The sample map specifies a number of samples to be generated for each pixel in the rendered image. When the renderer 205 is configured to generate the adaptive samples using ray tracing, the sample map specifies a number of paths to be traced for each pixel in the rendered image. Generally, the quality of the rendered image improves as the number of samples increases, but the processing performance (e.g., pixels per second) may limit the quality to maintain an interactive (e.g., real time) frame rate. Compared with a fixed sampling rate of 4 spp (samples per pixel), an adaptive sampling redistributes the samples across the entire rendered image and may specify an average sampling rate of 4 spp with individual pixel sampling rates ranging from zero to eight or even higher.

The sample map estimator neural network model 210 processes the input data for each image in a sequence based on the warped external state that is also used by the denoiser neural network model and combiner 220. The input data comprises per-pixel guide such as depth, surface normal vector, and motion vectors. Generally, guide data are data defined per-pixel to help the reconstruction process. However, in contrast with conventional adaptive sampling techniques, the guide data does not include sampled color data, such as uniformly sampled one sample-per-pixel "seed" color data. Instead of receiving a low resolution version of the image, the sample map estimator neural network model 210 receives the warped reconstructed image included in the warped external state. Therefore, an initial rendering pass is not required to generate low resolution the color data. In an embodiment, the guide data does not include three-dimensional primitives.

As previously described, the input to the denoiser neural network model and combiner 220 is the adaptively sampled noisy image (e.g., adaptive samples), rendered as dictated by the sample map. The denoiser neural network model and combiner 220 also receives the same inputs as provided to the sample map estimator neural network model 210, namely the input data and the warped external state. The sample map estimator neural network model 210 and the denoiser neural network model and combiner 220 are jointly trained to learn the parameters for generating the sample maps and the external state, respectively.

Figure 2E:
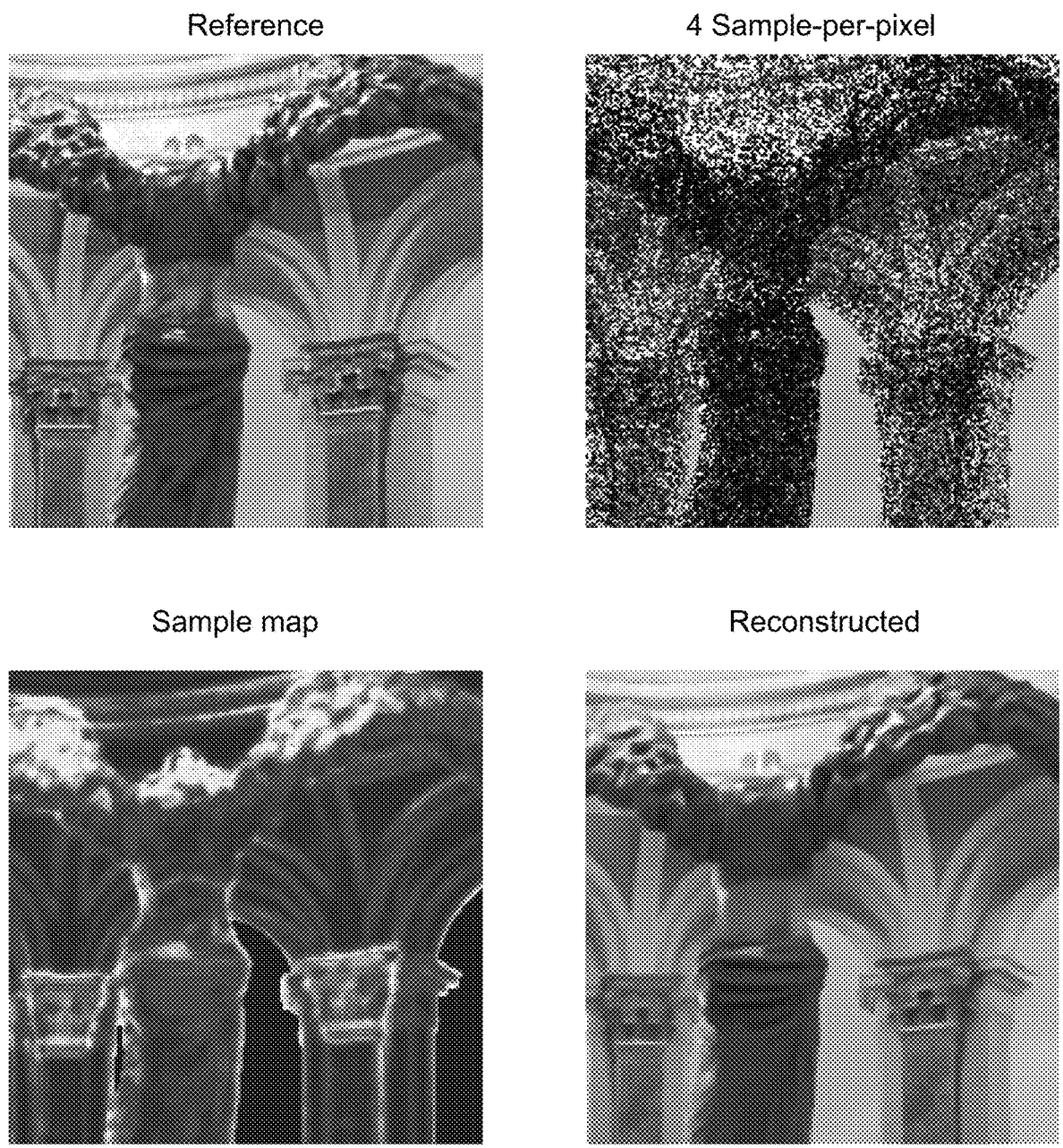
FIG. 2E illustrates an artifact-free reference image, the reference image at 4 sample-per-pixel resolution, and a sample map and a reconstructed image generated by the temporal adaptive sampling and denoising system of FIG. 2D, in accordance with an embodiment.

FIG. 2E illustrates high resolution (e.g., 1024 spp) reference image, the reference image at 4 spp, and a sample map and a reconstructed image generated by the temporal adaptive sampling and denoising system 200, in accordance with an embodiment. The reference image is sampled at 4 spp to produce the 4 sample-per-pixel image. Within the sample map, the darker portions indicate pixels to be sampled at a low rate and the brighter portions indicate pixels to be sampled at higher rates. Note that the brighter portions correspond to edges and areas of more detail or greater color variation in the reference image and the darker portions correspond to areas in the reference image of constant or similar color.

As previously described, the sample map estimator neural network model 210 receives input data including guide data that is processed to generate the sample map. The guide data may include the surface normal at the primary hit point intersecting each pixel, the depth value for each pixel, and/or a motion vector per pixel. In an embodiment, other per-pixel guide data may be used, such as material parameters. Through training, the sample map estimator neural network model 210 learns spatio-temporal sampling strategies such as placing more samples in disoccluded regions, tracking specular highlights, and the like, boosting the effective sample count and increasing temporal stability. Use of the warped external state alleviates the need for an initial uniform sampling step, as is often used in conventional adaptive sampling techniques. The renderer 205 generates each rendered image in the sequence according to the respective sample map. The rendered image is processed by the denoiser neural network model and combiner 220, removing artifacts, to produce the reconstructed image shown in FIG. 2E. The reconstructed image approximates the reference image and has fewer artifacts compared with the rendered image.

Figure 2F:
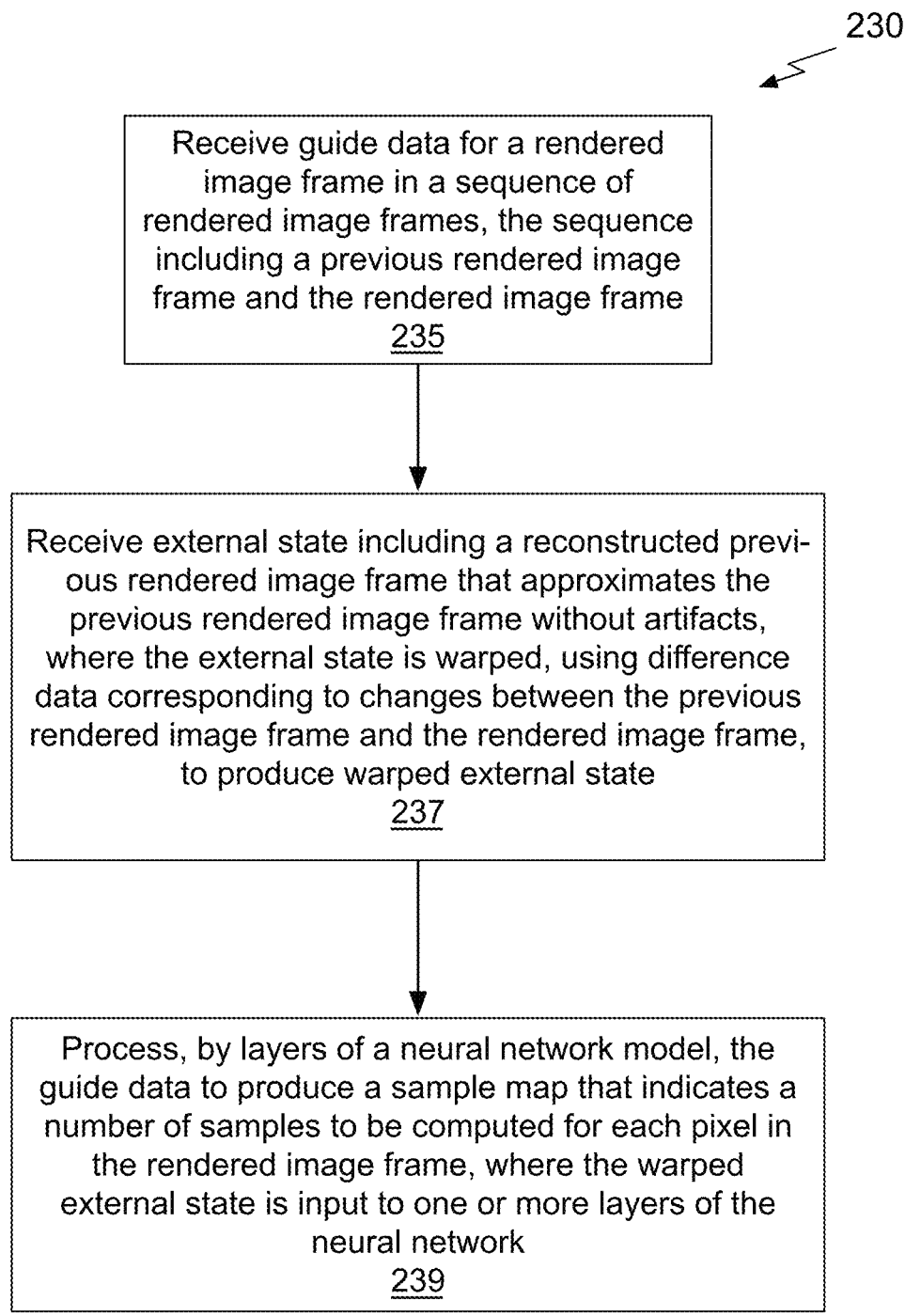
FIG. 2F illustrates a flowchart of a method for spatio-temporal adaptive sampling, in accordance with an embodiment.

FIG. 2F illustrates a flowchart of a method 230 for spatio-temporal adaptive sampling, in accordance with an embodiment. Although method 230 is described in the context of a processing unit, the method 230 may also be performed by a program, custom circuitry, or by a combination of custom circuitry and a program. For example, the method 230 may be executed by a GPU (graphics processing unit), CPU (central processing unit), or any processor capable of implementing the sample map estimator neural network model 210. Furthermore, persons of ordinary skill in the art will understand that any system that performs method 230 is within the scope and spirit of embodiments of the present invention.

At step 235, guide data for a rendered image frame in a sequence of rendered image frames is received by the sample map estimator neural network model 210. The sequence includes a previous rendered image frame and the rendered image frame. In an embodiment, the guide data is per-pixel feature guides including one or more feature buffers for the current rendered image frame (e.g., surface normal vectors, depth, motion vectors, and albedo at first hit). To denoise a frame in the sequence, guide data for the current frame and information for the previous frame in the sequence that is encoded in the external state are processed by the sample map estimator neural network model 210. However, only a single image frame needs to be rendered in sequence to estimate each sample map. Therefore, denoising can be performed in real-time. A minimal amount of temporary data is generated (guide data and warped external state) in real-time for each frame to produce a reconstructed/denoised image frame and the temporary data may then be discarded rather than stored to memory. In contrast, for off-line (e.g., non-real-time) denoising, the sequence of image frames and corresponding guide data is generated and stored and later read as each image frame is reconstructed/denoised.

At step 237, external state including a reconstructed first rendered image frame that approximates the first rendered image frame without artifacts is received by the sample map estimator neural network model 210. In other words, the reconstructed first rendered image has fewer artifacts compared with the first rendered image. The external state is warped by the temporal warp function 215, using difference data corresponding to changes between the first rendered image frame and the second rendered image frame (e.g., optical flow, motion vectors, or the like), to produce warped external state. Warping the external state anchors individual characteristics or features to regions within the rendered image frames. The warped external state enables improved tracking over time by integrating information associated with changing features over multiple frames in a sequence, producing more temporally stable and higher quality reconstructed images.

In an embodiment, the external state is produced by the temporal adaptive sampling and denoising system 200 processing guide data for the first rendered image frame. In an embodiment, an earlier (e.g., t−1) rendered image frame in the sequence is not available and the external state is initialized to zero or another predetermined value for processing the guide data for the first rendered image frame. Because the external state is initialized, there may be a short transition period of 2-3 frames between different sequences (e.g., clips) before the sample maps and reconstructed rendered image frames produced by the temporal adaptive sampling and denoising system 200 achieve a desired level of quality.

At step 239, the guide data for the second rendered image frame is processed, based on the warped external state, using the layers of the sample map estimator neural network model 210 to produce a sample map that indicates a number of samples to be computed for each pixel in the second rendered image. In an embodiment, the warped external state is input to one or more layers of the sample map estimator neural network model 210. In an embodiment, during processing of the guide data for the second rendered image, the warped external state replaces hidden state generated by a particular one of the layers during processing of the guide data for the first rendered image frame as an input to the one or more layers. In other words, each of the layers does not incorporate a feedback connection to use hidden state generated for a previous sample map to generate outputs and/or hidden state for the current sample map.

In an embodiment, the sample map is produced using direct prediction, by combining all output features into a single component gray-scale image using a final convolutional layer. The sample map may be normalized to reach a desired average sample count:

$$\hat{s}(p) = \text{round}\left(\frac{M \cdot e^{s(p)}}{\sum_{i=1}^{M} e^{s(i)}} \cdot n\right), \quad (3)$$

where M is the number of pixels in the image, n is the average number of samples per pixel, and s(p) is the unnormalized output of the network. In an embodiment, the normalization calculation is similar to a softmax operation. For training the temporal adaptive sampling and de-noising system 200, implementing normalization by applying a softmax operation over the unrolled image tensor may improve stability of the gradient computation for backpropagation as opposed to chaining the individual operations.

In an embodiment, color inputs (e.g., albedo and the warped t-1 reconstructed rendered image frame) to the sample map estimator neural network model 210 are converted to gray scale using CCIR 601 weights v=0.2989R+ 0.587G+0.114B. Using gray scale encourages the adaptive sampling generated by the sample map estimator neural network model 210 to be independent of chroma and motivated by noise levels, geometric complexity, and/or animation/disocclusion.

The sample map for the second rendered image frame may be used by the renderer 205 to generate adaptive samples representing the second rendered image frame including artifacts. The artifacts may be a loss of high-frequency details and residual noise. The adaptive samples and the warped external state may then be processed using layers of the denoiser neural network model and combiner 220 to produce external state including a reconstructed second image frame that approximates the second image frame without artifacts.

Figure 2G:
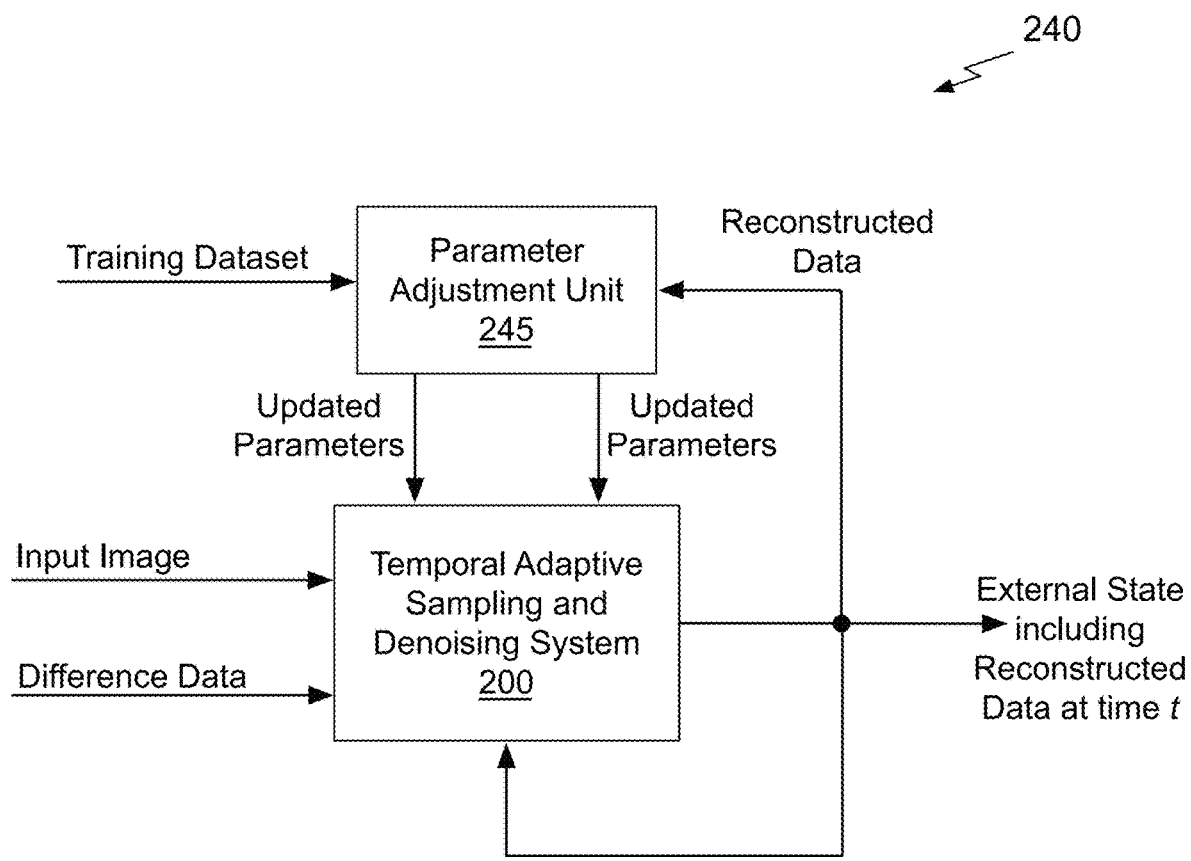
FIG. 2G illustrates a block diagram of a configuration for training the temporal adaptive sampling and denoising system of FIG. 2D, in accordance with an embodiment.

FIG. 2G illustrates a block diagram of a configuration 240 for training the temporal adaptive sampling and denoising system 200 of FIG. 2D, in accordance with an embodiment. The training configuration 240 includes the temporal adaptive sampling and denoising system 200 and a parameter adjustment unit 245. Although the training configuration 240 is described in the context of processing units, one or more of the temporal adaptive sampling and de-noising system 200 and the parameter adjustment unit 245 may be performed by a program, custom circuitry, or by a combination of custom circuitry and a program. Furthermore, persons of ordinary skill in the art will understand that any system that performs the operations of the training configuration 240 is within the scope and spirit of embodiments of the present invention.

The training dataset includes guide data for sequences of image frames and corresponding sequences of target image frames without artifacts (e.g., reference image frames). Performance of the temporal adaptive sampling and denoising system 200 is improved when the training dataset includes the types of artifacts that exist in the sequences of input data to be restored when the temporal adaptive sampling and denoising system 200 is deployed.

The temporal adaptive sampling and denoising system 200 processes the guide data in the training dataset to generate reconstructed image frames. The parameter adjustment unit 245 receives the reconstructed image frames and target image frames included in the training dataset and adjusts parameters of the temporal adaptive sampling and denoising system 200 based on errors between the reconstructed data and the target data frames. After training is complete, the parameters are fixed and the temporal adaptive sampling and denoising system 200 may be deployed to perform data reconstruction. During deployment the parameter adjustment unit 245 is not used. In an embodiment, the sample map estimator neural network model 210 is deployed without the denoiser neural network model and combiner 220 and/or the renderer 205. In an embodiment, the denoiser neural network model and combiner 220 is deployed without the sample map estimator neural network model 210 and/or the renderer 205.

The objective for the temporal adaptive sampling and denoising system 200 is to generate reconstructed data $\hat{y}$ that matches the reference solution y as close as possible. In other words, the objective is to find the vector of all convolutional parameters (e.g., weights and biases) of the temporal adaptive sampling and denoising system 200 that minimizes the error or loss function on the training data without overfitting. Because the choice of loss function can significantly alter the outcome of the training process, the loss function may vary.

To account for the recurrent term (the warped reconstructed rendered image frame), back-propagation through time may be employed, training on sequences of N frames. When sequences of five frames are used, one frame is used for initialization and the four subsequent frames are used to train unrolled iterations of the temporal adaptive sampling and de-noising system 200. For the first frame, the recurrent term may be initialized to the noisy uniformly sampled image at a target sample count.

Because the sample map estimator neural network model 210 and the denoiser neural network model and combiner 220 are trained end-to-end together, the loss term is only computed on the final reconstructed image, and there is no specific loss computed for the sample map. In an embodiment, both a spatial $L_1$ and a temporal $L_1$ loss terms are used, weighted equally and both computed in gamma corrected logarithmic space. The temporal $L_1$ term is intended to suppress temporal flickering during animation and is computed as the $L_1$ norm of the temporal finite differences between frame i and frame i−1. Let $x_i$ be the denoised frame and $y_i$ be the corresponding reference frame, where i is the current time step. The temporal gradients are $\Delta x_i = x_i - x_{i-1}$ and $\Delta y_i = y_i - y$, and the loss, L, is:

$$L = L_1(x_i, y_i) + L_1(\Delta x_i, \Delta y_i) \quad (4)$$

In an embodiment, when training, the spatial loss is only applied to the last reconstructed image frame of each sequence, and the temporal loss by necessity involves the last two reconstructed image frames. The training procedure ensures that the temporal adaptive sampling and denoising system 200 has access to a reasonable amount of temporal information and avoids transients from initializing the recurrent term.

Figure 2H:
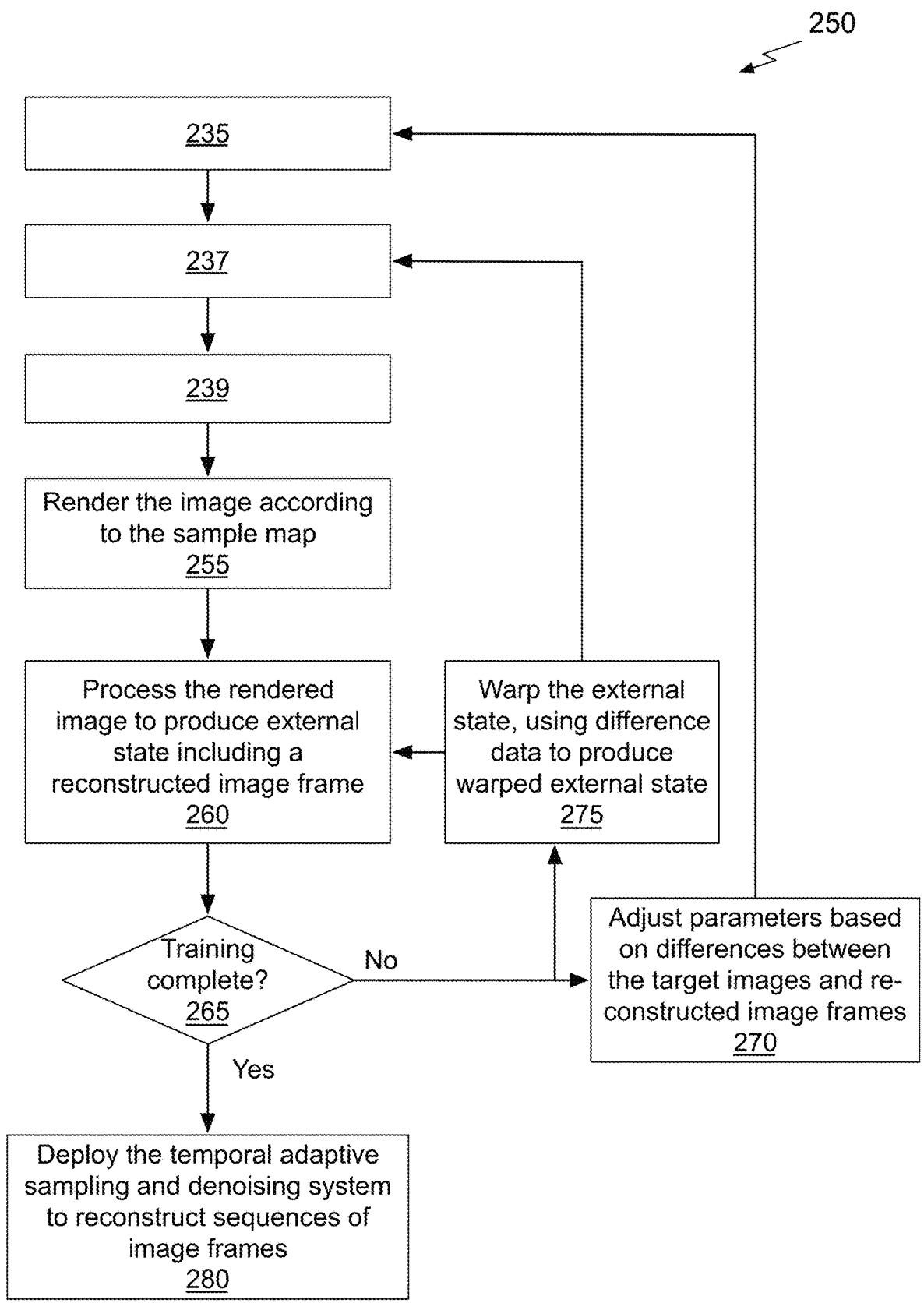
FIG. 2H illustrates a flowchart of a method for training the temporal adaptive sampling and denoising system of FIG. 2D, in accordance with an embodiment.

FIG. 2H illustrates a flowchart of a method 250 for training the temporal adaptive sampling and denoising system 200 of FIG. 2D, in accordance with an embodiment. Although method 250 is described in the context of a processing unit, the method 250 may also be performed by a program, custom circuitry, or by a combination of custom circuitry and a program. For example, the method 250 may be executed by a GPU (graphics processing unit), CPU (central processing unit), or any processor capable of implementing the temporal adaptive sampling and denoising system 200. Furthermore, persons of ordinary skill in the art will understand that any system that performs method 250 is within the scope and spirit of embodiments of the present invention.

The method 250 includes steps 235, 237, and 239 from the method 230. At step 235, guide data corresponding to a sequence of target image frames in a training dataset is received by the temporal adaptive sampling and denoising system 200. At step 255, the renderer 205 renders the image according to the sample map. At step 260, the denoiser neural network model and combiner 220 processes the rendered image to produce external state including a reconstructed image frame.

At step 265, the parameter adjustment unit 245 determines if the training is complete. A loss function may be computed by the parameter adjustment unit 245 to measure distances (i.e., differences or gradients) between the target output data and the reconstructed data. The temporal adaptive sampling and denoising system 200 is deemed to be sufficiently trained when the reconstructed data generated for the input data from the training dataset match the target output data or a threshold accuracy is achieved for the training dataset.

If the training is not complete at step 265, then at step 270 the parameter adjustment unit 245 adjusts the parameters based on differences between the target output data frames and the output data frames before returning to step 235 to process additional sequences. If the training is not complete at step 265, then at step 275, the temporal warp function 215 warps the external state using the difference data to produce warped external state. The parameter adjustment unit 245 is configured to adjust the parameter values to reduce differences between the target output data and the reconstructed data. If the training is complete at step 265, then at step 280, the temporal adaptive sampling and denoising system 200 is deployed to reconstruct sequences of data frames.

The warped external recurrent neural networks 100 and temporal adaptive sampling and denoising system 200 are designed with three key goals: reconstructed image quality, temporal stability, and real-time performance. To achieve the goals, recurrence is utilized to help improve the resulting temporal stability, and to ensure efficiency. However, in contrast with conventional autoencoders, the recurrence is externalized such that the previous output is an additional input to the encoder/decoder neural network model 110, the sample map estimator neural network model 210, and the denoiser neural network model and combiner 220. Finally, a temporal warp is applied to align past output with the current frame, significantly improving the ability of encoder/decoder neural network model 110 or 210 to use past information.

The relative visual quality of the image sequences output by the warped external recurrent neural networks 100 and the temporal adaptive sampling and denoising system 200 is substantially better than real-time alternatives and approaches the quality of supersampled image sequences. To produce the high-quality and highly temporally stable results for anti-aliasing, only a single sample-per-pixel color is required by the warped external recurrent neural networks 100 for input image frames along with motion vectors. In contrast, for supersample anti-aliasing (SSAA) techniques, at least 16 samples-per-pixel color are needed for each pixel to produce similar quality output image frames. The single sample-per-pixel color input is replaced with guide data for the temporal adaptive sampling and denoising system 200 to reconstruct adaptively sample sequences of rendered images.

The use of external recurrence with temporal warping generates consistently better static image quality and rendered image sequences that are more temporally stable. In summary, warped external recurrent neural networks 100 are able to perform antialiasing with high-quality results and without any additional artifacts. When the encoder/decoder neural network model 110 is trained end-to-end to minimize the $L_2$ distance between pairs of aliased and anti-aliased images, the encoder/decoder neural network model 110 learns to identify aliased image features and to adaptively filter the aliased image features out (i.e., remove or reduce the aliased image features).

Similarly, when the temporal adaptive sampling and denoising system 200 is trained end-to-end to minimize the $L_1$ spatial and temporal distance between target images and reconstructed rendered images, the sample map estimator neural network model 210 learns to determine a number of samples for each pixel needed to provide spatio-temporal image fidelity and the and denoiser neural network model and combiner 220 learns to adaptively filter spatial and temporal artifacts resulting from adaptive sampling, respectively. Rather than relying on an initial uniformly sampled images as inputs to the sample map estimator neural network model 210, the warped external state is used to produce low sample count sample maps to preserve high-frequency details while achieving temporally stable adaptive sampling.

In sum, the temporal adaptive sampling and denoising system 200 uses temporal reprojection and adaptive sampling to achieve high quality temporally stable, denoising of path traced animation sequences at interactive rates. By combining temporal reuse and adaptive sampling, the temporal adaptive sampling and denoising system 200, learns to reconstruct difficult temporal effects, such as disocclusion and view dependent shading (e.g., specular highlights).

Parallel Processing Architecture

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
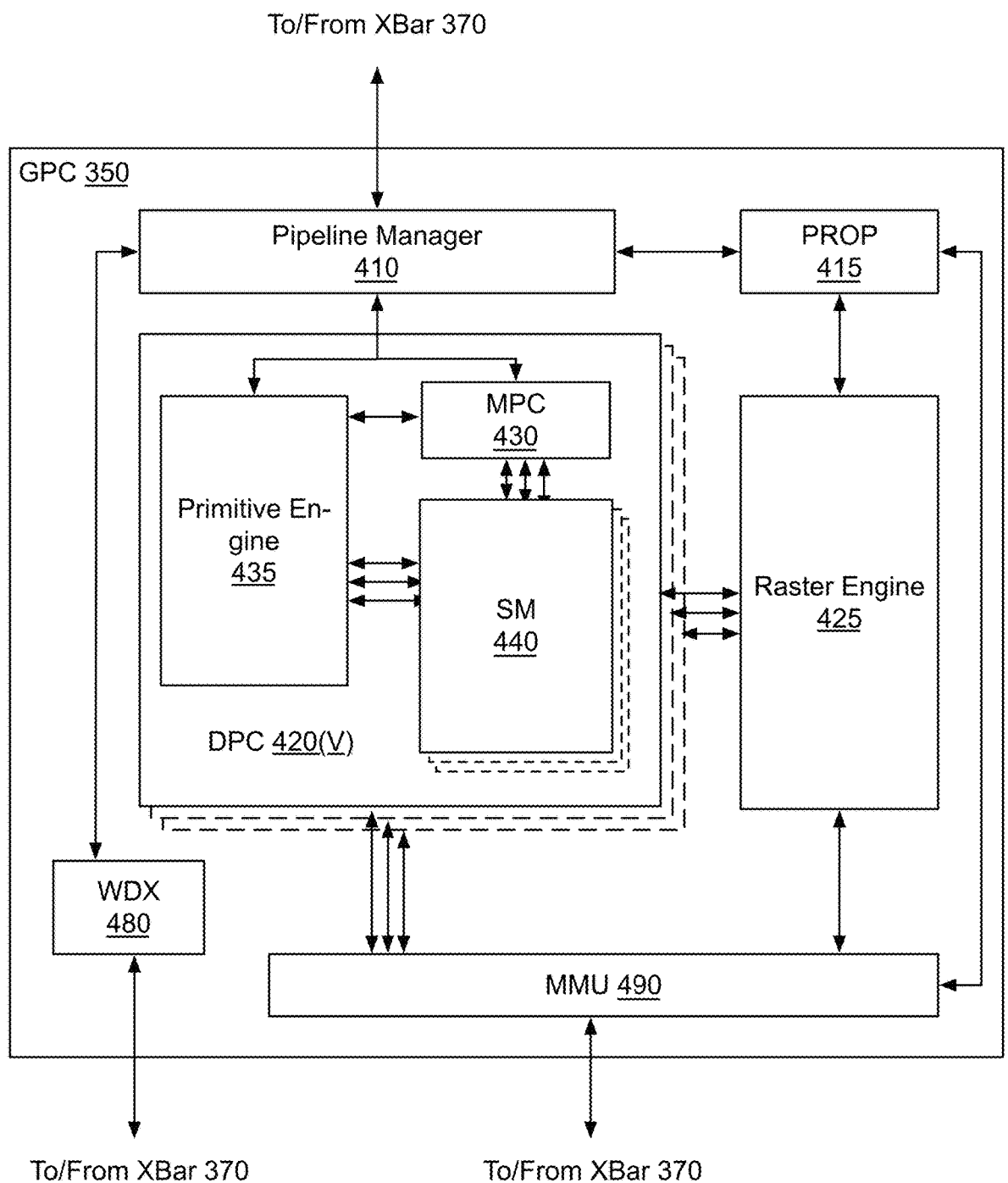
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
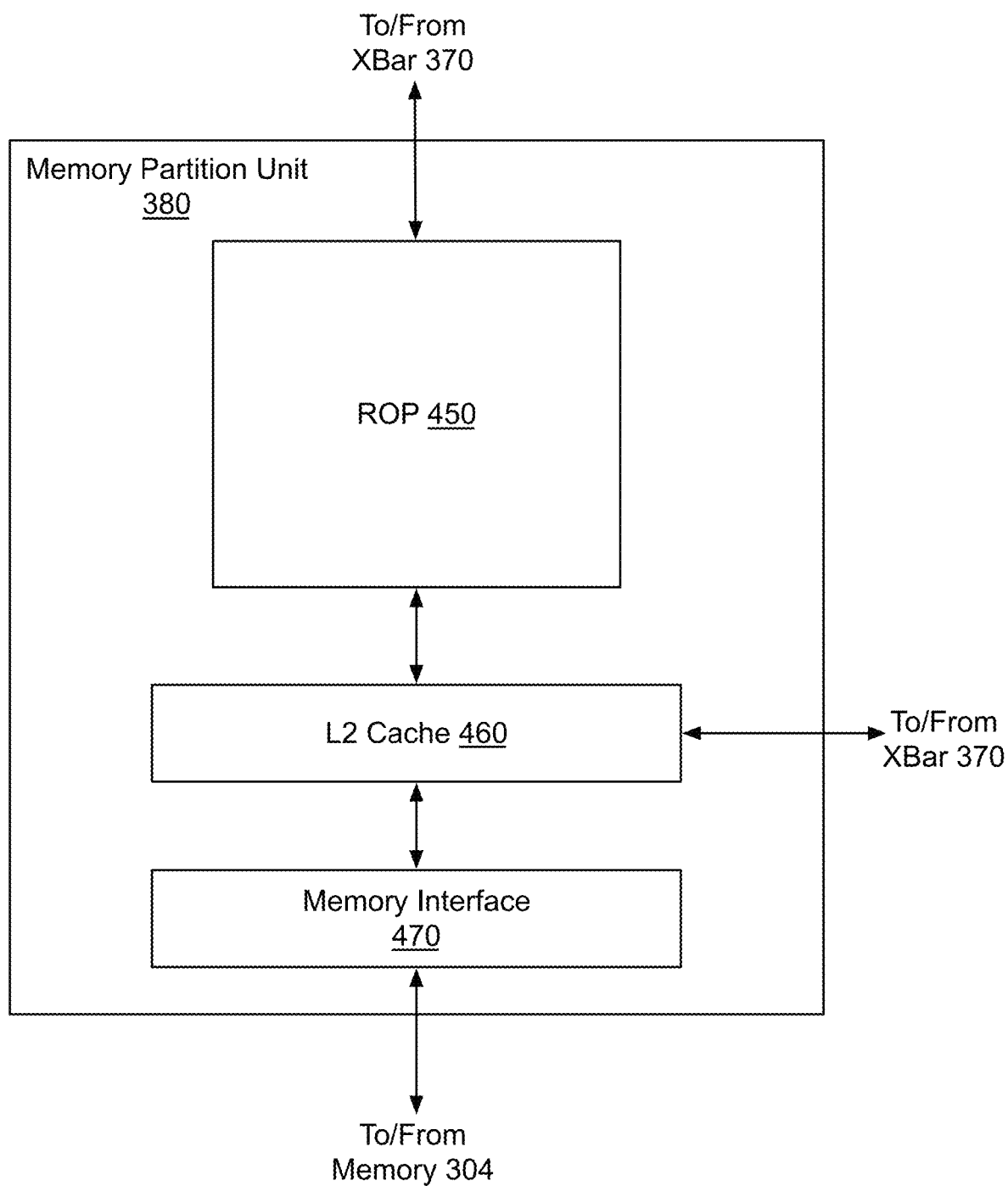
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
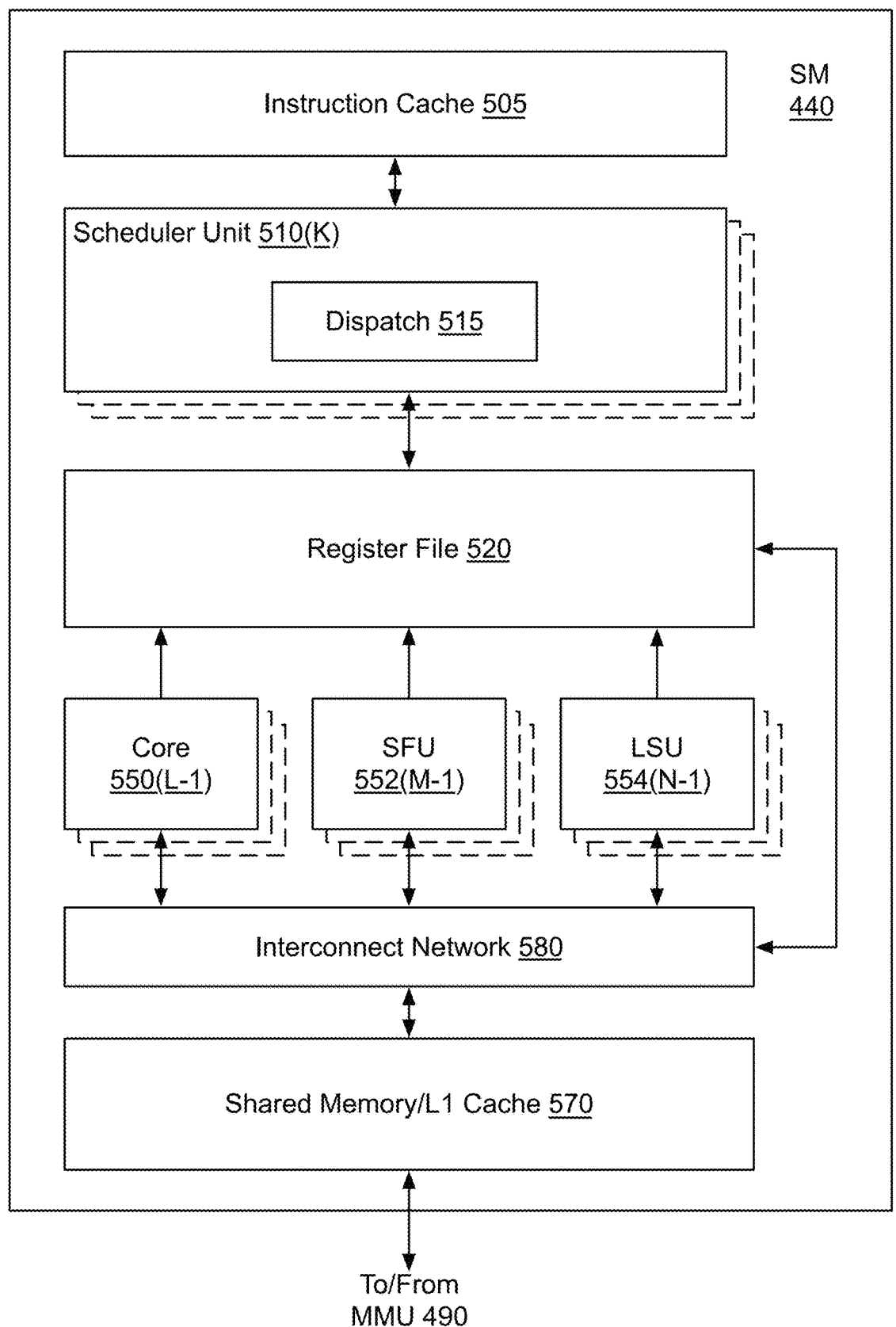
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( )) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
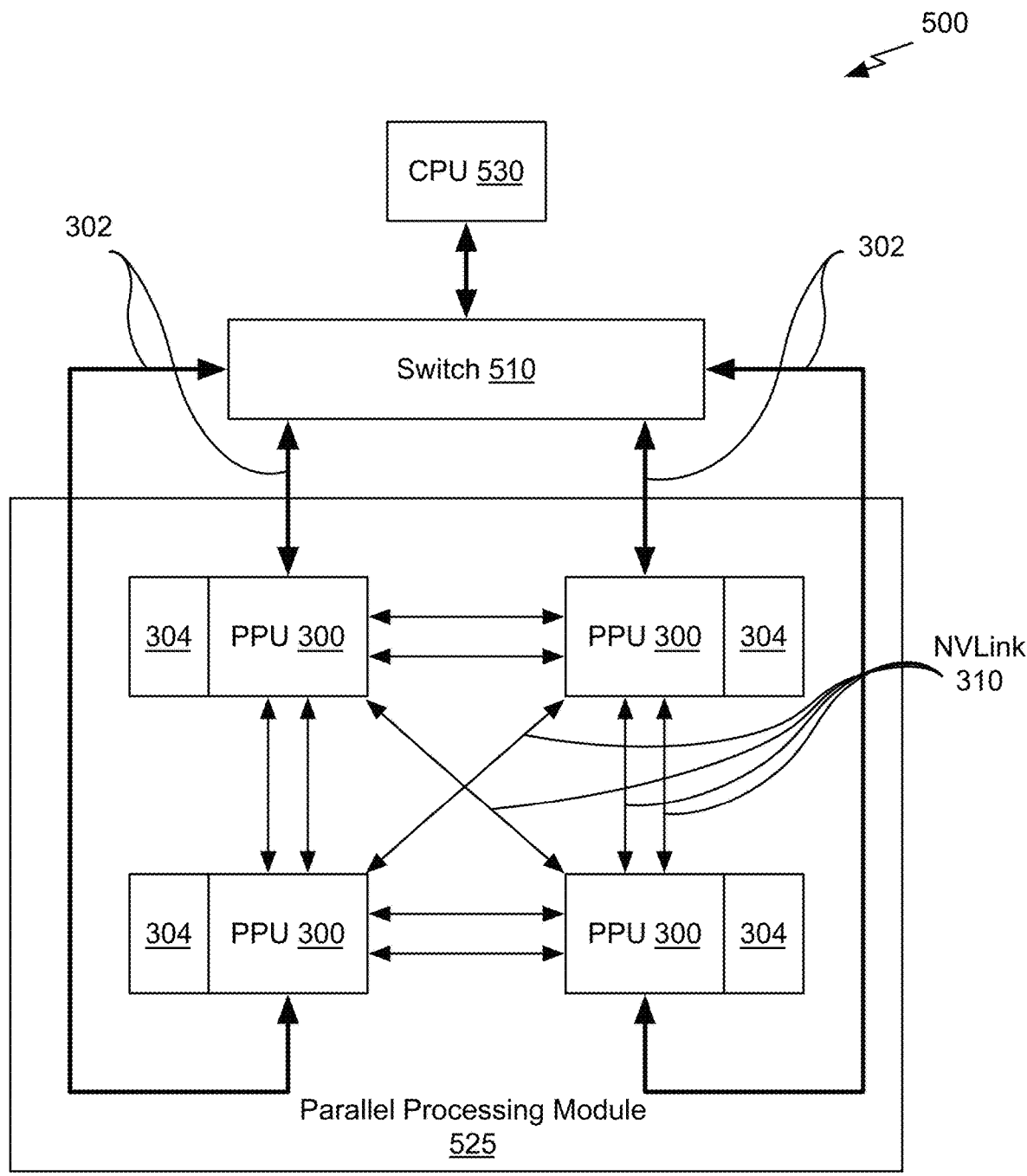
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the methods 130, 160, 230, and 250 shown in FIGS. 1B, 1C, 2F, and 2H respectively. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
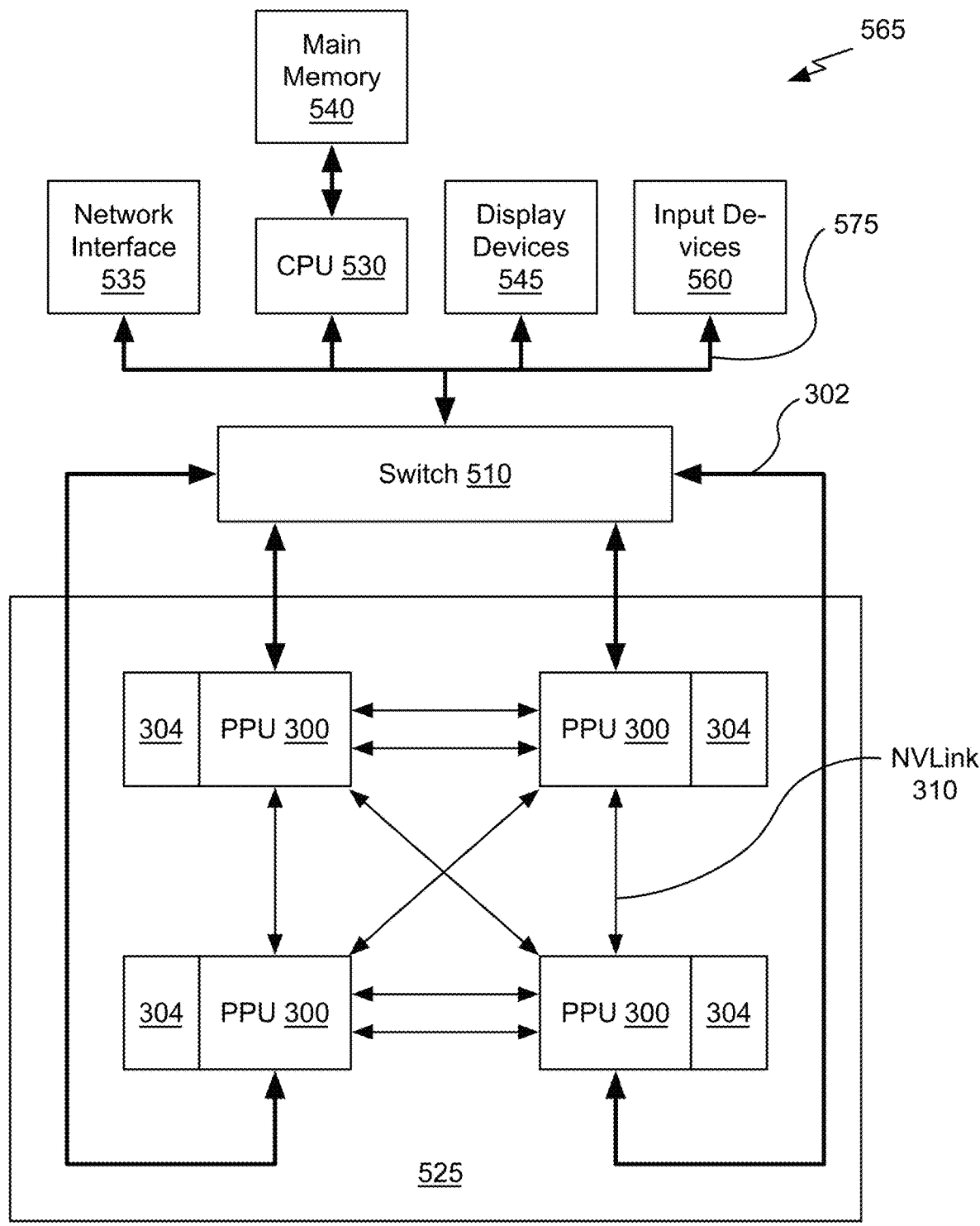
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the methods 130, 160, 230, and 250 shown in FIGS. 1B, 1C, 2F, and 2H respectively.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
    receiving guide data for a rendered image frame in a sequence of rendered image frames, the sequence including a previous rendered image frame and the rendered image frame;
    receiving external state including a reconstructed previous rendered image frame with fewer artifacts compared with the previous rendered image frame, wherein the external state is warped, using difference data corresponding to changes between the previous rendered image frame and the rendered image frame, to produce warped external state;
    processing the guide data for the rendered image frame using layers of a neural network model to produce a sample map that indicates a number of samples to be computed for each pixel in the rendered image frame, wherein the warped external state is input to one or more of the layers of the neural network; and
    processing the guide data for the previous rendered image frame using layers of the neural network model to produce a first sample map that indicates a number of samples to be computed for each pixel in the previous rendered image frame, wherein an initial warped external state is input to one or more of the layers of the neural network.

2. The computer-implemented method of claim 1, further comprising rendering the rendered image frame according to the sample map.

3. The computer-implemented method of claim 2, wherein the rendered image frame includes artifacts including at least a loss of high-frequency detail or residual noise.

4. The computer-implemented method of claim 1, further comprising processing the previous rendered image frame using layers of a reconstruction neural network model to produce the external state.

5. The computer-implemented method of claim 1, wherein the guide data comprises normal vectors, depth, or albedo.

6. The computer-implemented method of claim 1, wherein the difference data is motion vectors.

7. A computer-implemented method, comprising:
receiving guide data for a rendered image frame in a sequence of rendered image frames, the sequence including a previous rendered image frame and the rendered image frame;
receiving external state including a reconstructed previous rendered image frame with fewer artifacts compared with the previous rendered image frame, wherein the external state is warped, using difference data corresponding to changes between the previous rendered image frame and the rendered image frame, to produce warped external state;
processing the guide data for the rendered image frame using layers of a neural network model to produce a sample map that indicates a number of samples to be computed for each pixel in the rendered image frame, wherein the warped external state is input to one or more of the layers of the neural network; and
processing the rendered image frame using layers of a reconstruction neural network model to produce second external state including a reconstructed rendered image frame with fewer artifacts compared with the rendered image frame.

8. The computer-implemented method of claim 7, wherein processing the rendered image frame to produce the reconstructed data frame is based on the warped external state.

9. The computer-implemented method of claim 7, wherein processing the rendered image frame to produce the reconstructed image frame is based on the guide data for the rendered image frame.

10. The computer-implemented method of claim 7, further comprising adjusting parameters of the neural network model and the reconstruction neural network model based on differences between the reconstructed image frame and the rendered image frame without artifacts.

11. A system, comprising:
a processing unit configured as a neural network model to:
receive guide data for a rendered image frame in a sequence of rendered image frames, the sequence including a previous rendered image frame and the rendered image frame;
receive external state including a reconstructed previous rendered image frame with fewer artifacts compared with the previous rendered image frame, wherein the external state is warped, using difference data corresponding to changes between the previous rendered image frame and the rendered image frame, to produce warped external state;
process the guide data for the rendered image frame using layers of the neural network model to produce a sample map that indicates a number of samples to be computed for each pixel in the rendered image frame, wherein the warped external state is input to one or more of the layers of the neural network;
process the guide data for the previous rendered image frame using layers of the neural network model to produce a first sample map that indicates a number of samples to be computed for each pixel in the previous rendered image frame.

12. The system of claim 11, further comprising a renderer that is coupled to the neural network model and configured to render the rendered image frame according to the sample map.

13. The system of claim 12, wherein the rendered image frame includes artifacts including at least a loss of high-frequency detail or residual noise.

14. The system of claim 11, further comprising a reconstruction neural network model configured to process the previous rendered image frame using layers of the reconstruction neural network model to produce the external state.

15. The system of claim 11, wherein the guide data comprises normal vectors, depth, or albedo.

16. A system, further comprising:
a processing unit configured as a neural network model to:
receive guide data for a rendered image frame in a sequence of rendered image frames, the sequence including a previous rendered image frame and the rendered image frame;
receive external state including a reconstructed previous rendered image frame with fewer artifacts compared with the previous rendered image frame, wherein the external state is warped, using difference data corresponding to changes between the previous rendered image frame and the rendered image frame, to produce warped external state;
process the guide data for the rendered image frame using layers of the neural network model to produce a sample map that indicates a number of samples to be computed for each pixel in the rendered image frame, wherein the warped external state is input to one or more of the layers of the neural network;
a reconstruction neural network model configured to process the rendered image frame using layers of the reconstruction neural network model to produce second external state including a reconstructed rendered image frame with fewer artifacts compared with the rendered image frame.

17. The system of claim 16, wherein processing the rendered image frame to produce the reconstructed data frame is based on the warped external state.

18. A non-transitory, computer-readable storage medium storing instructions that, when executed by a processing unit, cause the processing unit to:
receive guide data for a rendered image frame in a sequence of rendered image frames, the sequence including a previous rendered image frame and the rendered image frame;
receive external state including a reconstructed previous rendered image frame with fewer artifacts compared with the previous rendered image frame, wherein the external state is warped, using difference data corresponding to changes between the previous rendered image frame and the rendered image frame, to produce warped external state;
process the guide data for the rendered image frame using layers of a neural network model to produce a sample map that indicates a number of samples to be computed for each pixel in the rendered image frame, wherein the warped external state is input to one or more of the layers of the neural network; and process the guide data for the previous rendered image frame using layers of the neural network model to produce a first sample map that indicates a number of samples to be computed for each pixel in the previous rendered image frame.

19. A non-transitory, computer-readable storage medium storing instructions that, when executed by a processing unit, cause the processing unit to:
receive guide data for a rendered image frame in a sequence of rendered image frames, the sequence including a previous rendered image frame and the rendered image frame;
receive external state including a reconstructed previous rendered image frame with fewer artifacts compared with the previous rendered image frame, wherein the external state is warped, using difference data corresponding to changes between the previous rendered image frame and the rendered image frame, to produce warped external state;
process the guide data for the rendered image frame using layers of a neural network model to produce a sample map that indicates a number of samples to be computed for each pixel in the rendered image frame, wherein the warped external state is input to one or more of the layers of the neural network; and
process the rendered image frame using layers of a reconstruction neural network model to produce second external state including a reconstructed rendered image frame with fewer artifacts compared with the rendered image frame.

* * * * *